US011126905B2

(12) United States Patent
Zajic et al.

(10) Patent No.: US 11,126,905 B2
(45) Date of Patent: Sep. 21, 2021

(54) ANTENNA-LESS RFID TAG

(71) Applicant: Georgia Tech Research Corporation, Atlanta, GA (US)

(72) Inventors: Alenka Zajic, Atlanta, GA (US); Chia-Lin Cheng, Atlanta, GA (US); Luong N. Nguyen, Atlanta, GA (US); Milos Z. Prvulovic, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 24 days.

(21) Appl. No.: 16/685,521

(22) Filed: Nov. 15, 2019

(65) Prior Publication Data
US 2020/0160133 A1    May 21, 2020

Related U.S. Application Data

(60) Provisional application No. 62/768,335, filed on Nov. 16, 2018.

(51) Int. Cl.
*G06K 19/07* (2006.01)
*G06K 7/10* (2006.01)
(Continued)

(52) U.S. Cl.
CPC ....... *G06K 19/0723* (2013.01); *G06K 7/0008* (2013.01); *G06K 7/10356* (2013.01); *G06K 19/07749* (2013.01); *H04B 5/0062* (2013.01)

(58) Field of Classification Search
CPC ............. G06K 19/0723; G06K 7/0008; G06K 7/10356; G06K 19/07749; G06K 19/0715; H04B 5/0062
See application file for complete search history.

(56) References Cited

U.S. PATENT DOCUMENTS 7,388,468 B2 * 6/2008 Diorio ................ G06K 19/0723
340/10.4
8,284,027 B2 * 10/2012 Taki ...................... G01S 13/878
340/10.1
(Continued)

OTHER PUBLICATIONS

S. J. Thomas, E. Wheeler, J. Teizer and M. S. Reynolds, "Quadrature Amplitude Modulated Backscatter in Passive and Semipassive UHF RFID Systems," in IEEE Transactions on Microwave Theory and Techniques, vol. 60, No. 4, pp. 1175-1182, Apr. 2012. (Year: 2012).*

(Continued)

*Primary Examiner* — Brian E Miller
(74) *Attorney, Agent, or Firm* — Meunier Carlin & Curfman LLC

(57) ABSTRACT

A semi-passive radio frequency identification (RFID) tag includes a digital circuit with switching components operating within an interrogation range of an incident carrier wave. A plurality of input connections and output connections direct data communications through the switching components within the digital circuit, and the data communications are subject to switching operations of the switching components between at least one of the input connections and at least one of the output connections. A backscatter response reflected from the digital circuit upon arrival of the incident carrier wave, wherein the backscatter response is a modulated backscatter response in the presence of the switching operations.

19 Claims, 25 Drawing Sheets

(51) Int. Cl.
*H04B 5/00* (2006.01)
*G06K 7/00* (2006.01)
*G06K 19/077* (2006.01)

(56) References Cited

U.S. PATENT DOCUMENTS

| | | | | |
|---|---|---|---|---|
| 8,319,611 | B2* | 11/2012 | Tsukamoto | G06K 19/0723 340/10.34 |
| 8,416,063 | B2* | 4/2013 | Jung | G06K 19/0701 340/10.34 |
| 8,477,015 | B1* | 7/2013 | Pai | G06K 7/1098 340/10.1 |
| 9,306,498 | B2* | 4/2016 | Simons | H03C 3/245 |
| 9,489,813 | B1* | 11/2016 | Beigel | G08B 13/2417 |
| 10,430,622 | B2* | 10/2019 | Nikitin | G06K 7/10227 |
| 10,587,438 | B2* | 3/2020 | Roe | H04L 27/0002 |
| 2005/0052279 | A1* | 3/2005 | Bridgelall | G06K 19/0724 340/10.1 |
| 2005/0057368 | A1* | 3/2005 | Corbett | G06K 7/0008 340/10.1 |
| 2005/0237953 | A1* | 10/2005 | Carrender | G01S 13/84 370/278 |
| 2007/0210923 | A1* | 9/2007 | Butler | G06K 19/0723 340/572.8 |
| 2008/0186137 | A1* | 8/2008 | Butler | G06K 19/0723 340/10.1 |
| 2008/0252459 | A1* | 10/2008 | Butler | G06K 7/10366 340/572.1 |
| 2011/0007846 | A1* | 1/2011 | Marien | G06K 19/0723 375/319 |
| 2011/0309969 | A1* | 12/2011 | Gravelle | G01S 13/765 342/130 |
| 2012/0003951 | A1* | 1/2012 | Kawaguchi | G06K 7/0008 455/337 |
| 2012/0127021 | A1* | 5/2012 | Gravelle | G01S 13/765 342/130 |
| 2020/0160133 | A1* | 5/2020 | Zajic | G06K 7/0008 |
| 2021/0027608 | A1* | 1/2021 | Shakedd | G08B 21/24 |

OTHER PUBLICATIONS

Jankowski-Mihułowicz, P.; Węglarski, M.; Pitera, G.; Kawalec, D.; Licho 'n, W. Development board of the autonomous semi-passive RFID transponder. Bull. Pol. Acad. Sci. Tech. Sci. 2016, 64, 647-654. (Year: 2016).*

Memon, Mudasar L.; Saxena, Navrati; Roy, Abhishek; Shin, Dong R. 2019. "Backscatter Communications: Inception of the Battery-Free Era—A Comprehensive Survey" Electronics 8, No. 2: 129. (Year: 2019).*

I. Cnaan-On, S. J. Thomas, J. L. Krolikand M. S. Reynolds, "Multichannel Backscatter Communication and Ranging for Distributed Sensing With an FMCW Radar," in IEEE Transactions on Microwave Theory and Techniques, vol. 63, No. 7, pp. 2375-2383, Jul. 2015 (Year: 2015).*

Singh, Rohit, "FPGA Vs ASIC: Differences Between Them And Which One To Use?" Jul. 17, 2018. https://numato.com/blog/differences-between-fpga-and-asics/ (Year: 2018).*

A. Costanzo et al., "Merging RFID, visual and gesture recognition technologies to generate and manage smart environments," in Proc. IEEE Int. Conf. RFID-Technol. Appl., Sep. 2011, pp. 521-526.

L. Yang, A. Rida, R. Vyas, and M. M. Tentzeris, "RFID tag and RF structures on a paper substrate using Inkjet-printing technology," IEEE Trans. Microw. Theory Techn., vol. 55, No. 12, pp. 2894-2901, Dec. 2007.

S.-J. Wu and T.-G. Ma, "A passive UHF RFID meandered tag antenna with tuning stubs," in Proc. Asia—Pac. Microw. Conf., Dec. 2006, pp. 1486-1492.

P. Pursula et al., "Millimeter-wave identification—A new short-range radio system for low-power high data-rate applications," IEEE Trans. Microw. Theory Techn., vol. 56, No. 10, pp. 2221-2228, Oct. 2008.

S. Lemey et al., "Wearable flexible lightweight modular RFID tag with integrated energy harvester," IEEE Trans. Microw. Theory Techn., vol. 64, No. 7, pp. 2304-2314, Jul. 2016.

K. Finkenzeller, RFID Handbook: Fundamentals and Applications in Contactless Smart Cards and Identification, 3rd ed. Hoboken, NJ, USA: Wiley, 2005.

F. Pebay-Peyroula, J. Reverdy, E. Crochon, and T. Thomas, "Very high data rate contactless air interface: An innovative solution for card to reader link," in Proc. IEEE Int. Conf. RFID (IEEE RFID), Apr. 2010, pp. 203-209.

N. Pillin, N. Joehl, C. Dehollain, and M. J. Declercq, "High data rate RFID tag/reader architecture using wireless voltage regulation," in Proc. IEEE Int. Conf. RFID, Apr. 2008, pp. 141-149.

J. Besnoff, M. Abbasi, and D. S. Ricketts, "High data-rate communication in near-field RFID and wireless power using higher order modulation," IEEE Trans. Microw. Theory Techn., vol. 64, No. 2, pp. 401-413, Feb. 2016.

S. Tedjini et al., "Hold the chips: Chipless technology, an alternative technique for RFID," IEEE Microw. Mag., vol. 14, No. 5, pp. 56-65, Jul./Aug. 2013.

V. Coskun, K. Ok, and B. Ozdenizci, Developing NFC Applications, Hoboken, NJ, USA: Wiley, 2012, pp. 151-239. [Online]. http://ieeexplore.ieee.org/xpl/articleDetails.jsp?arnumber=8044008.

Near-Field Communication (NFC) Market Analysis by Product (SD Cards, SIM Cards, NFC Covers, NFC ICs, NFC Tags and NFC Readers), by Application (Access Control, Ticketing, Data Sharing, Medical Devices, Transaction, Product Identification) and Segment Forecasts till 2024. Accessed: Oct. 2016. [Online]. Available: https://www.grandviewresearch.com/industry-analysis/nearfield-communication-nfc-market.

P. Chan and V. Fusco, "Bi-static 5.8Ghz RFID range enhancement using retrodirective techniques," in Proc. 41st Eur. Microw. Conf., Oct. 2011, pp. 976-979.

W. G. Yeoh et al., "A 2.45-GHz RFID tag with on-chip antenna," in Proc. IEEE Radio Freq. Integr. Circuits (RFIC) Symp., Jun. 2006, p. 4.

I. Vaisband and E. G. Friedman, "Stability of distributed power delivery systems with multiple parallel on-chip LDO regulators," IEEE Trans. Power Electron., vol. 31, No. 8, pp. 5625-5634, Aug. 2016.

E. Perret et al., "THID, the next step of chipless RFID," in Proc. IEEE Int. Conf. RFID (RFID), Apr. 2013, pp. 261-268.

S. Preradovic and N. C. Karmakar, "Design of fully printable planar chipless RFID transponder with 35-bit data capacity," in Proc. Eur. Microw. Conf. (EuMC), Sep. 2009, pp. 13-16.

M. Pöpperl, J. Adametz, and M. Vossiek, "Polarimetric radar barcode: A novel chipless RFID concept with high data capacity and ultimate tag robustness," IEEE Trans. Microw. Theory Techn., vol. 64, No. 11, pp. 3686-3694, Nov. 2016.

(2016). Teardowns. [Online]. Available: https://www.ifixit.com/Teardown.

D. Wu, M. J. Hussain, S. Li, and L. Lu, "R2: Over-the-air reprogramming on computational RFIDs," in Proc. IEEE Int. Conf. RFID (RFID), May 2016, pp. 1-8.

D. D. Donno, L. Catarinucci, A. D. Serio, and L. Tarricone, "A long-range computational RFID tag for temperature and acceleration sensing applications," Progr. Electromagn. Res. C, vol. 45, pp. 223-235, Dec. 2013.

R. Colella, D. D. Donno, L. Tarricone, and L. Catarinucci, "Unconventional UHF RFID tags with sensing and computing capabilities," J. Commun. Softw. Syst., vol. 10, No. 2, pp. 83-89, 2014.

T. Bjorninen et al., "Wireless measurement of RFID IC impedance," IEEE Trans. Instrum. Meas., vol. 60, No. 9, pp. 3194-3206, Sep. 2011.

M. S. Reynolds, "A 500° C. tolerant ultra-high temperature 2.4 Ghz 32 bit chipless RFID tag with a mechanical BPSK modulator," in Proc. IEEE Int. Conf. RFID (RFID), May 2017, pp. 144-148.

H. Stockman, "Communication by means of reflected power," Proc. IRE, vol. 36, No. 10, pp. 1196-1204, Oct. 1948.

J. D. Griffin and G. D. Durgin, "Complete link budgets for backscatter radio and RFID systems," IEEE Antennas Propag. Mag., vol. 51, No. 2, pp. 11-25, Apr. 2009.

(56) References Cited

OTHER PUBLICATIONS

J. M. Rabaey, A. Chandrakasan, and B. Nikolic, Digital Integrated Circuits, 3rd ed. Upper Saddle River, NJ, USA: Prentice-Hall, 2008.
M. Prvulovic, A. Zaji'c, R. L. Callan, and C. J. Wang, "A method for finding frequency-modulated and amplitude-modulated electromagnetic emanations in computer systems," IEEE Trans. Electromagn. Compatibility, vol. 59, No. 1, pp. 3442, Feb. 2017.
GNA-130F. [Online]. Available: http://rfbayinc.com/products_pdf/product_2_520.pdf.
FMR-6000 User Manual. Accessed: Nov. 2010. [Online]. Available: https://fccid.io/VBLFMR-6000/User-Manual/Users-Manual-1393998.
CMR-6100 Data Sheet, Intelleflex Corporat., Santa Clara, CA, USA, 2012. [Online]. Available: http://www.rfidmarket.com.tr/Data/EditorFiles/CMR-6100.pdf.
Bonding Wires for Semiconductor Technology, Scanditron, Spånga, Sweden. [Online]. 2017. Available: http://www.scanditron.com/sites/default/files/material/heraeus_bondingwire_brochure.pdf.
Calculator for Resistance of a Round Straight Wire. Accessed: Sep. 2010. [Online]. Available: https://chemandy.com/calculators/roundwire-ac-resistance-calculator.htm.
BSIM4 NMOS Model, Keysight Technol., Santa Rosa, CA, USA. [Online]. Available: http://edadocs.software.keysight.com/pages/viewpage.action?pageId=5512312.
BSIM4 PMOS Model, Keysight Technol., Santa Rosa, CA, USA. [Online]. Available: http://edadocs.software.keysight.com/pages/viewpage.action?pageId=5512639.
Cyclone V Device, Data Sheet CV-51002, Altera Corporat., San Jose, CA, USA, Dec. 2016.

\* cited by examiner

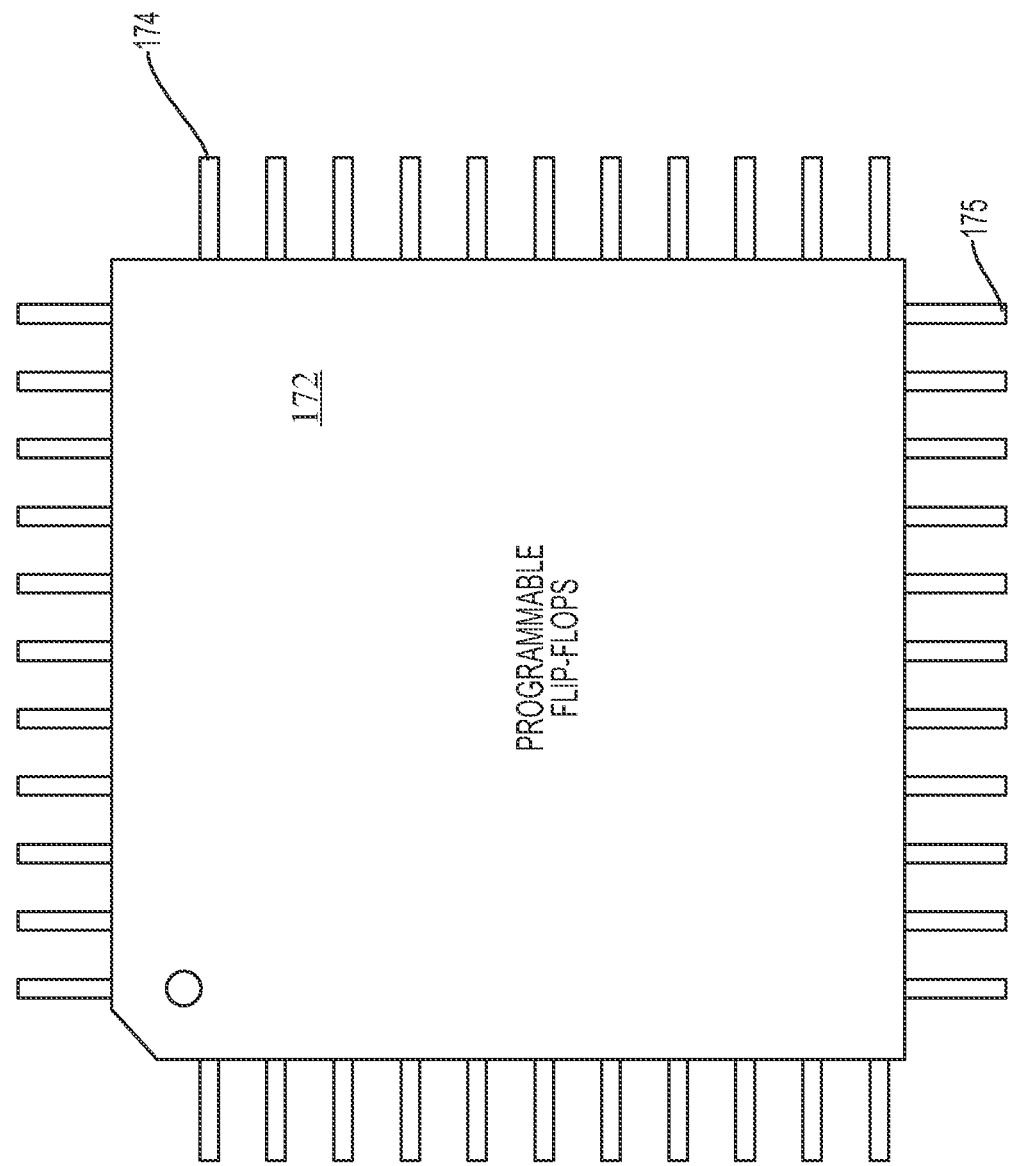

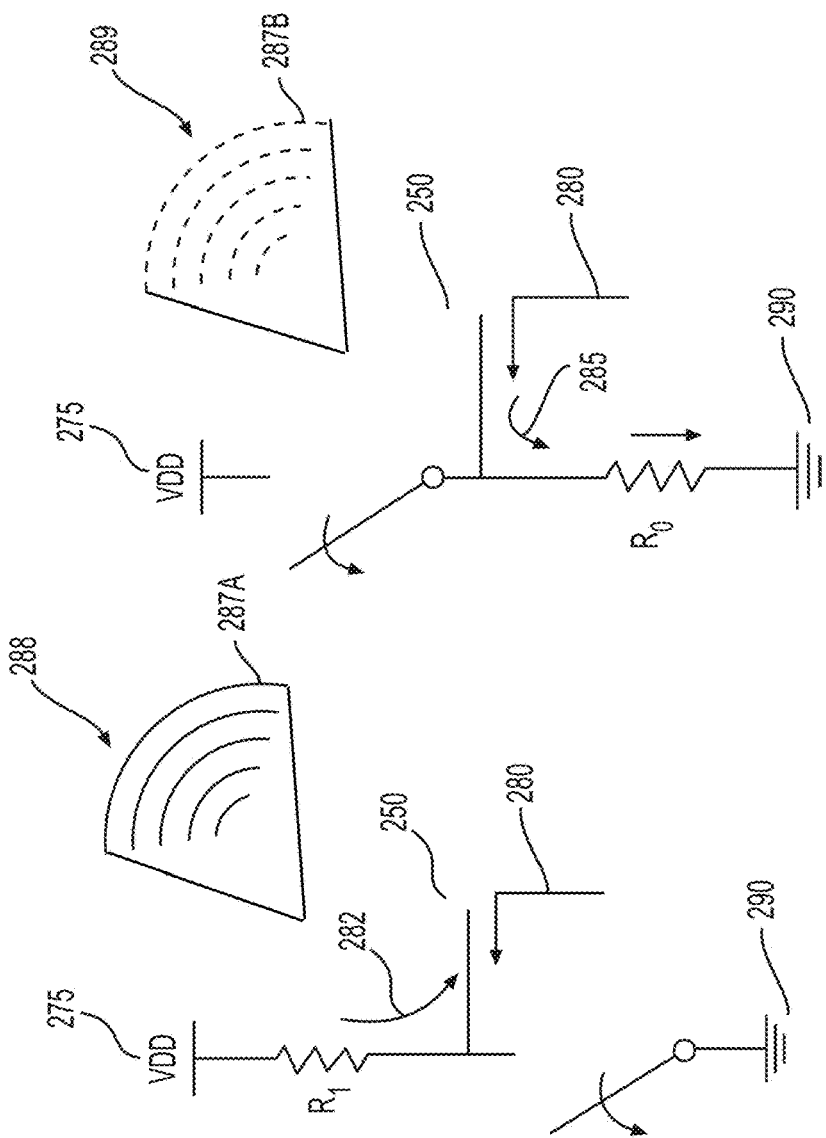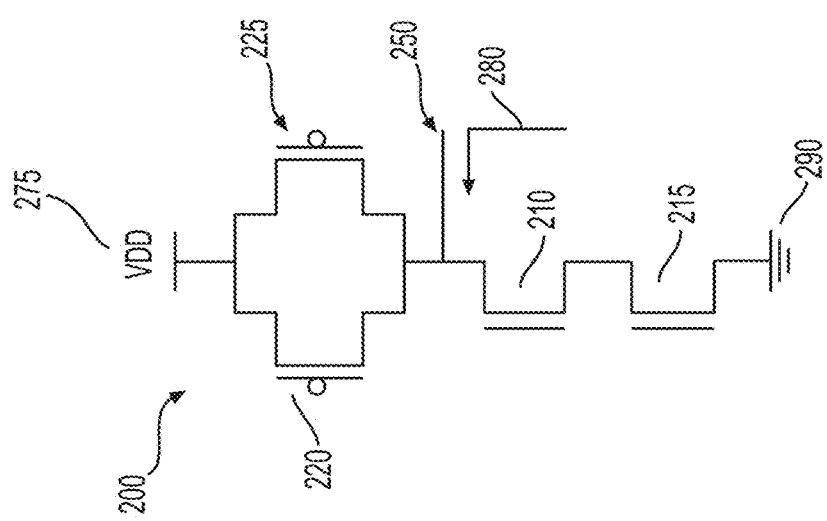
*FIG. 2C*
*FIG. 2B*
*FIG. 2A*
*(PRIOR ART)*

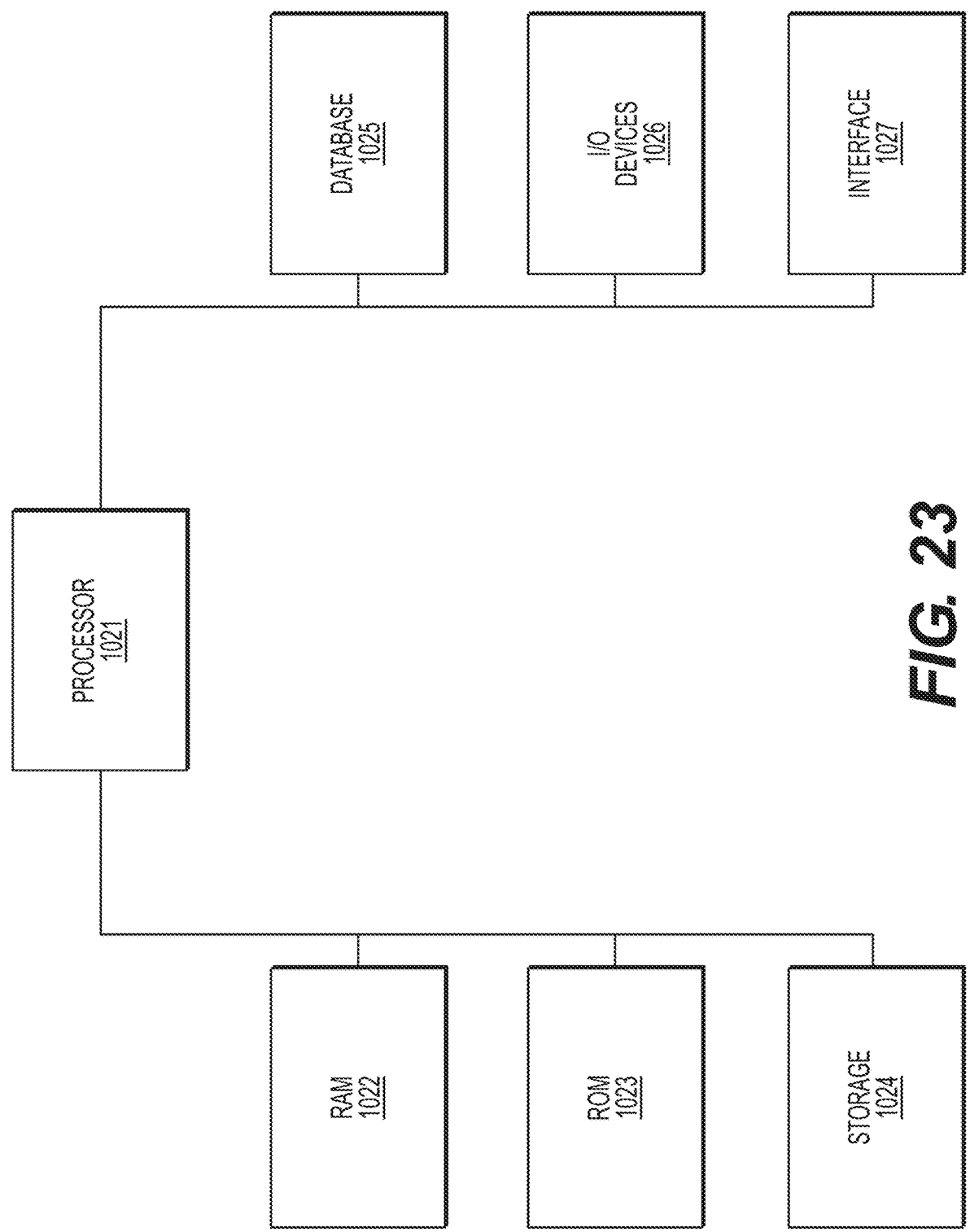

ANTENNA-LESS RFID TAG

CROSS-REFERENCE TO RELATED APPLICATIONS

This application claims priority to and incorporates by references U.S. Provisional Patent Application Ser. No. 62/768,335 filed on Nov. 16, 2019 and titled Antenna-less RFID Tag.

GOVERNMENT SUPPORT CLAUSE

This invention was made with government support under Grant No. 1651273 and Grant No. 1740962 awarded by the National Science Foundation and Grant No. N00014-17-1-2540 awarded by the Office of Naval Research. The government has certain rights in the invention.

BACKGROUND

Radio-frequency identification (RFID) and near-field communication (NFC) have been widely used in everyday life. Radio-frequency identification is typically used in supply chain management, asset tracking, data exchange, telemetry, access control, etc. [1]-[9] and has a market that is worth several billion dollars today and is expected to grow more than 10% per year [10]. On the other hand, near-field communication (NFC), also referred to as inductive-coupled RFID, is extensively used for promotional marketing, smart posters, security, files exchange, contactless payment, etc. [11] and has market that is expected to reach USD 47.43 billion by 2024 [12]. There are two main classes of RFID tags: chip-based, which use an integrated circuit (IC) chip to store tag information [8], [13]-[15], and chip-less, which use the electromagnetic signature of the all-passive tag substrate to store the information [16]-[18]. The RFIDs can also be classified as passive, semi-passive, and active depending on whether the tag uses electromagnetic sources for power and communication, uses battery power for only its IC circuits, or uses battery power for both IC circuits and communication. Existing RFID tags with computational chips [20]-[22] can only transmit 1 bit simultaneously. Existing analog-signal side-channels, such as EM emanations, are a consequence of current-flow changes that are dependent on activity inside electronic circuits. In this disclosure, a new class of side-channels is set forth that is a consequence of impedance changes in switching circuits, referred to herein as an impedance-based side-channel. One motivation to explore impedance-based side-channels was a hypothesis that the backscatter radio effect should be present in electronic devices.

A description of traditional backscatter data communication is a useful starting point. Traditional backscattering communication in prior art FIG. 1A refers to a radio channel where a reader sends a continuous carrier wave (CW) signal and retrieves information from a modulated wave scattered back from a tag. During backscatter operation, the input impedance of a tag antenna is intentionally mismatched by two-state RF loads (Z0 and Z1) to vary the tag's reflection coefficient and to modulate the incoming CW [25], [26].

Therefore, what is needed is an RFID tag that is flexible, accurate, and capable of achieving a high data rate.

SUMMARY

To improve the prediction accuracy and to overcome the limitation in spatial and temporal extensibility of individual empirical models, systems, methods and devices are disclosed.

In one embodiment, a semi-passive radio frequency identification (RFID) tag includes a digital circuit with switching components operating within an interrogation range of an incident carrier wave. A plurality of input connections and output connections direct data communications through the switching components within the digital circuit, and the data communications are subject to switching operations of the switching components between at least one of the input connections and at least one of the output connections. A backscatter response reflected from the digital circuit upon arrival of the incident carrier wave, wherein the backscatter response is a modulated backscatter response in the presence of the switching operations.

It should be understood that the above-described subject matter may also be implemented as a computer-controlled apparatus, a computer process, a computing system, or an article of manufacture, such as a computer-readable storage medium. Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 1B is a schematic representation of one example chip used as an RFID tag as set forth in this disclosure.

FIG. 2A is a PRIOR ART schematic representation of a digital circuit implementing an output circuit of a CMOS-NAND gate as set forth in one example of this disclosure.

FIG. 2B is a schematic representation of a low voltage input at the CMOS-NAND gate of FIG. 2A, turning on a PMOS transistor therein, and yielding a high state resistance (R1) and a distinct radar cross section of a backscatter response at the PMOS transistor as set forth in one example of this disclosure.

FIG. 2C is a schematic representation of a high voltage input at the CMOS-NAND gate of FIG. 2A, turning on an NMOS transistor therein, and yielding a low state resistance (R0) upon the NMOS transistor therein and a distinct radar cross section of a backscatter response as set forth in one example of this disclosure.

FIG. 7 illustrates building blocks of the multi-bit RFID tag. M' is the number of total shift registers (bits). $N_{M'}$ is the number of total configured flip-flops in an example circuit where $fm_{M'}$ is the modulating frequency of the M'th shift register.

FIG. 23 illustrates an exemplary computer that may comprise all or a portion of an antenna-less RFID tag or an antenna-less RFID tag control system, and/or a separate control system; conversely, any portion or portions of the computer illustrated in FIG. 23 may comprise all or a portion of an antenna-less RFID tag or an antenna-less RFID tag control system.

DETAILED DESCRIPTION

Figure 1A:
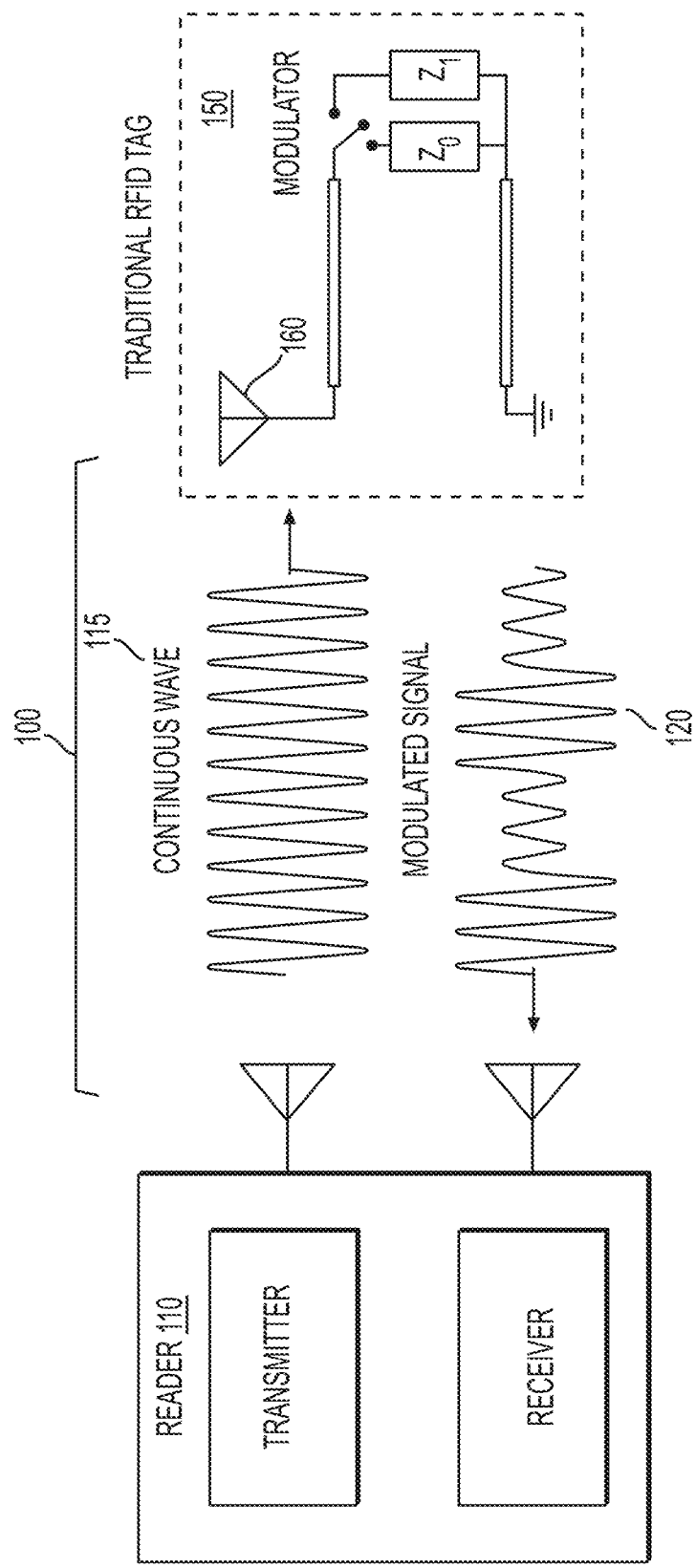
FIG. 1A is a PRIOR ART representation of a known RFID tag identification system.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description. As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

This disclosure introduces a new class of side-channels that is a consequence of impedance differences in switching circuits, and referred to herein as an impedance-based side-channel. In one non-limiting theory of operation, impedance differences between transistor gates 200 in the high-state 282 and in the low-state 280 change the radar cross section (RCS) 288, 289 of the back-scatter response and modulate the backscattered signal 287A, 287B. This theory of operation yields a proposed digital circuit that can be used as a semi-passive RFID tag. The RFID tag may be implemented in a field programmable gate array 499 (FPGA) as one non-limiting proof of concept. Proposed tags can be directly used in state-of-the-art smartphones such as Apple iPhone 7 and Samsung Galaxy S5 [19] that already have an FPGA board as a replacement for near-field communication (NFC) chips. More importantly, this approach opens up new possibilities for RFID designers to experiment with impedances of transistors switching from high-state to low-state and further optimize this transmission mechanism in ASIC designs. This disclosure describes in depth investigations into the possibility of implementing a proposed RFID tag on an ASIC for backscatter signal enhancement. Simulation results show that a 30 dB enhancement can be achieved by optimizing logic gates' impedances.

To illustrate flexibility of this design (circuit can be easily reprogrammed), one experiment interrogated the proposed RFID tag at the following frequencies: 1) 5.8 GHz, a frequency typically used for RFID communications, 2) 17.46 GHz, a frequency identified to have the highest signal-to-noise ratio (SNR), and 3) 26.5 GHz, a frequency that can be used for 5G wireless communications. Additionally, this disclosure illustrates a variety of RFID applications to demonstrate flexible bit-configuration structures. State-of-the-art RFID tags are selected to compare to newly proposed RFID applications, which include: static IDs with 6, 12, and 36 bits, multi-bit (4, 8, and 12 bits) dynamic RFID tag, and single-bit dynamic RFID tag. The proposed static ID configurations can transmit up to 36 bits simultaneously and provide up to 68.7 billion ($2^{36}$) combinations of unique IDs. The number and pattern of bits are fully re-configurable. This flexible bit design does not occupy additional space on the printed circuit board of the FPGA as the number of bits increases.

Figure 7:
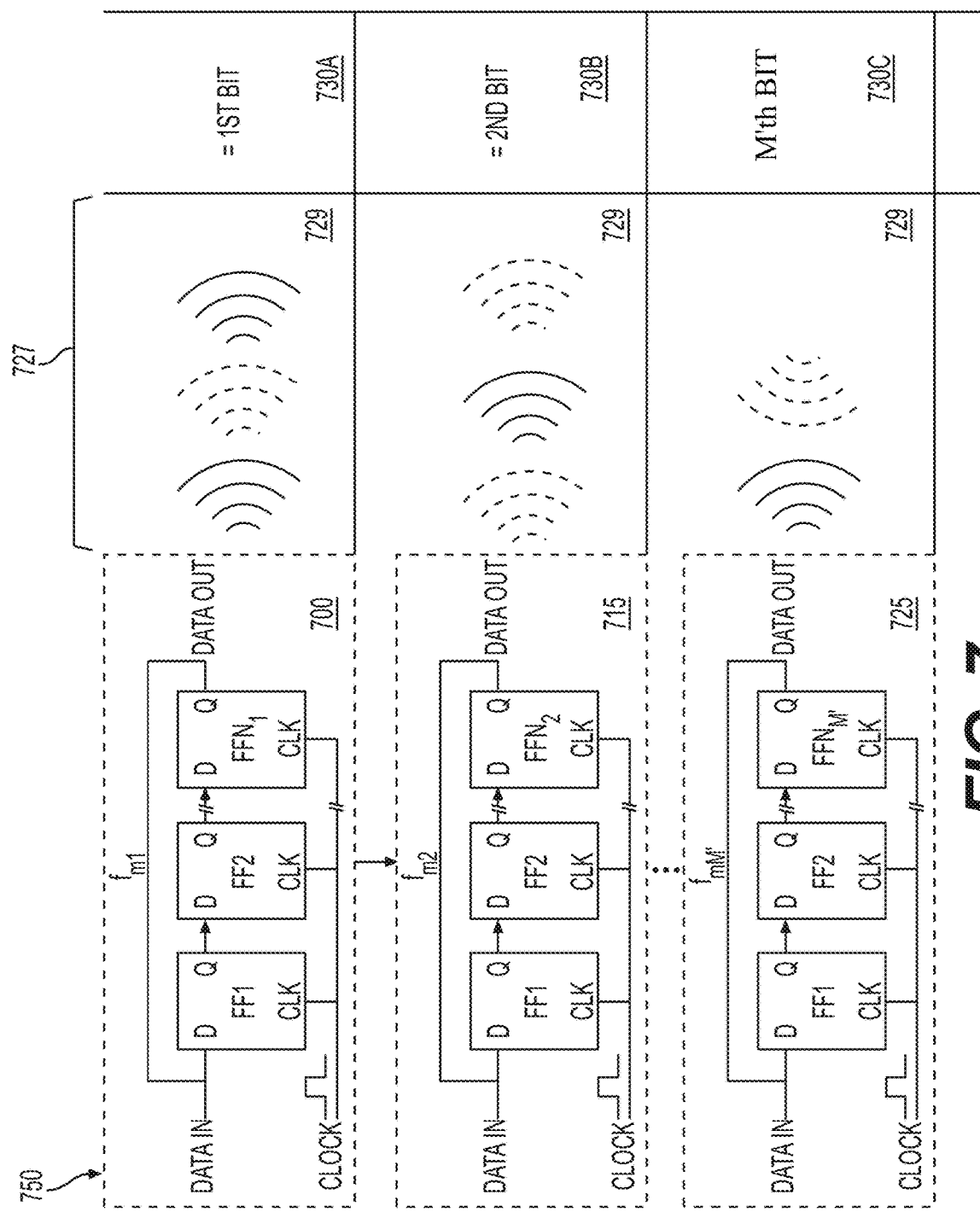
FIG. 7 is a block diagram of a multi-bit RFID tag illustrating each transmitted bit in a respective information data channel as a modulated backscatter signal from a respective section of a digital circuit at a respective modulation frequency $fm_x$ where x ranges from 1 to M'.

The proposed dynamic RFID tags with 4 bits, 8 bits, and 12 bits were implemented, and all bits were successfully detected. The achieved data rates are comparable with work in below noted reference [9], where both 16-QAM (quadrature amplitude modulation) and 4-PSK (phase shift keying) RFIDs are designed. This disclosure shows that a single-bit dynamic RFID tag has been tested as well. By transmitting one bit of information at a time to have better SNR, the proposed RFID tag can achieve a data rate of 100 kbits/sec with a bit error rate (BER) of 0.00000183 (10-6), which is comparable to state-of-the-art RFIDs in references [23] and [24]. The rest of the disclosure includes full descriptions of example implementations including, but not limited to, an impedance-based side-channel used for creating a backscattering communication information channel as illustrated in FIG. 7, Ref 730. FIG. 7 illustrates how information channels 730 can transmit modulated backscatter data 727 that is discernible from the backscatter response. The disclosure further investigates the possibility of implementing the proposed RFID on ASIC, and describes digital circuit design for proposed RFID tag. Other portions of this disclosure describe measurement setup and tests to determine the maximum range at which the new tag can be operated. This disclosure includes applications of the proposed RFID tag across frequencies of 5.8 GHz, 17.46 GHz, and 26.5 GHz.

Figure 3:
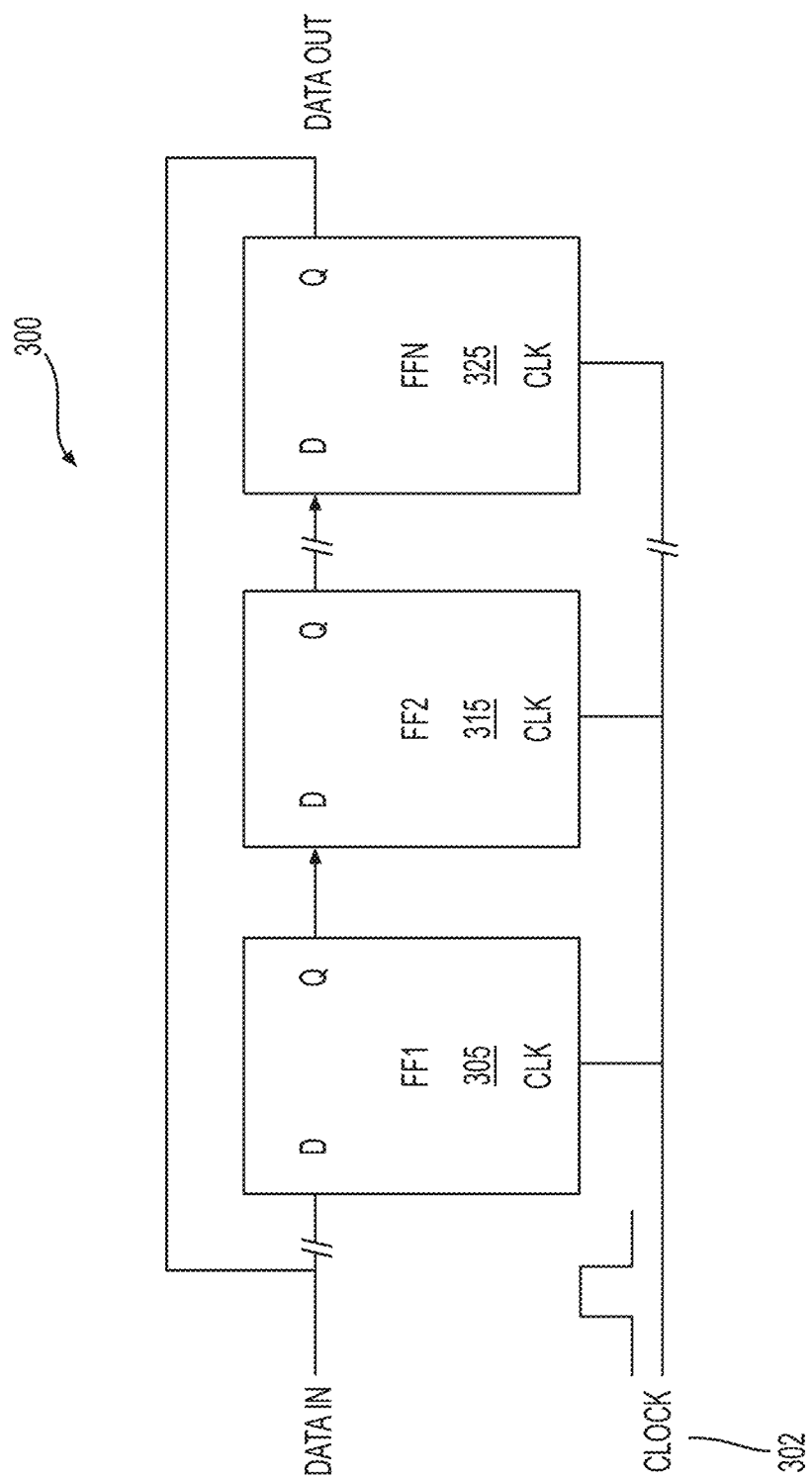
FIG. 3 is a diagram of a shift register utilizing a series of flip flop circuit components as disclosed in one example herein.
Figure 4:
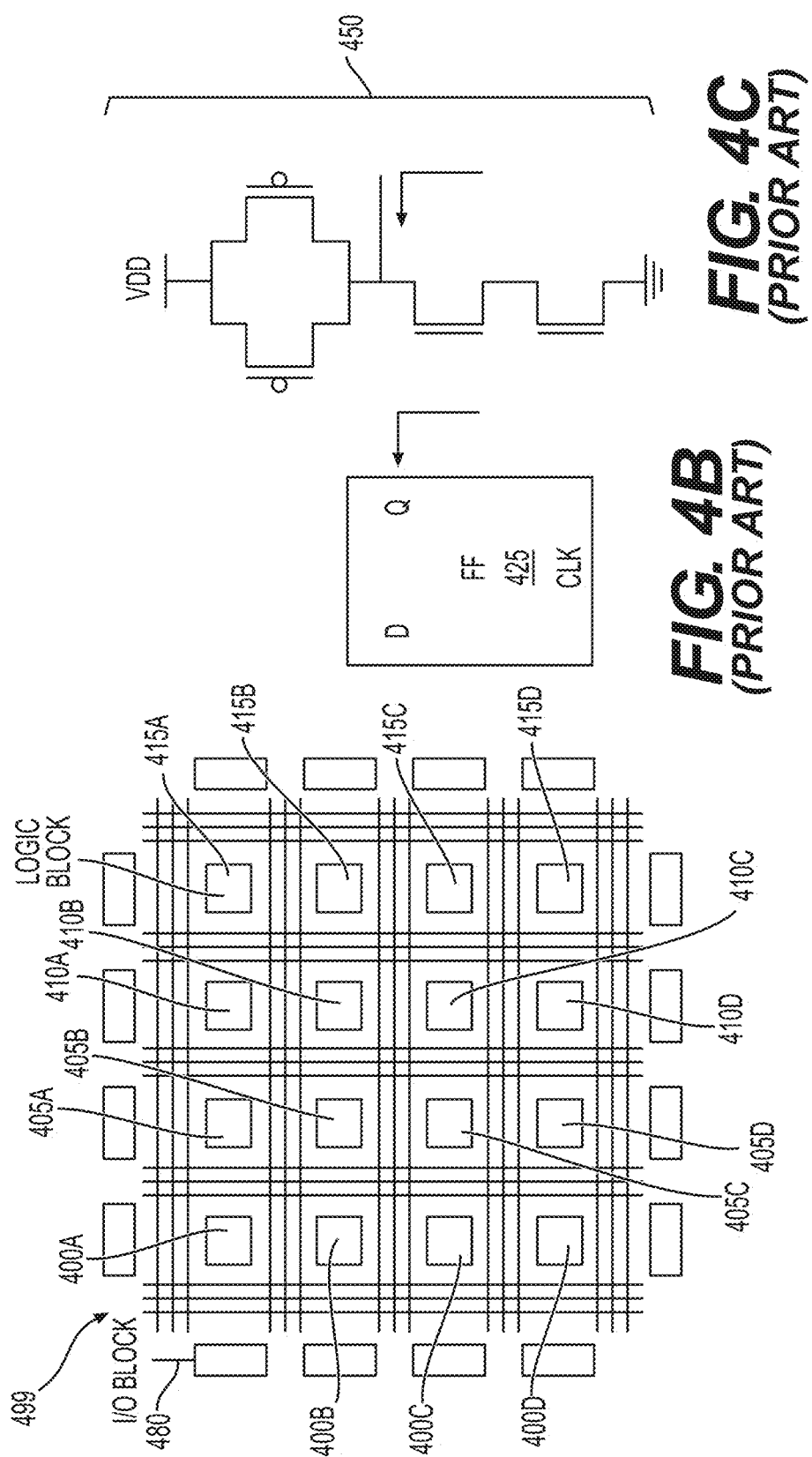
FIG. 4A is a diagram of an FPGA internal structure as set forth in one example of this disclosure.
FIG. 4B is a PRIOR ART diagram of one programmable flip flop circuit component used to implement a digital circuit as described in at least one example of this disclosure.
FIG. 4C is a PRIOR ART diagram of an equivalent circuit of the CMOS-NAND gate of FIG. 2A.

One non-limiting hypothesis for how circuits described herein may provide the above noted information channels 730 was that inverters 200 in digital electronics also have two-state RF loads and can be designed to reflect the modulated signal 288, 289. For example, as shown in FIG. 2, when input voltage is low, NMOS transistors 210, 215 in inverters are off and PMOS transistors 200, 225 are on. A direct path 282 exists between Vout 250 and VDD 275, resulting in a high output state 280. On the other hand, high input results in a low output state. As shown in FIG. 2B there exists a finite resistance R1 between the output 250 and VDD 275 and between the output 250 and the ground 290, respectively. See, e.g., Ref. [27]. The switching between the example NAND logic's high output state (R1) and low output state (R0) creates impedance variation in the example of FIG. 2, which is analogous to the variation in antenna terminating impedance in typical RFID tags of FIG. 1A. The impedance variation creates a difference in the circuit's radar cross section (RCS) illustrated as a variable back scatter radiation field 288, 289, and thus modulates the electronic backscatter signals. To test this hypothesis, this disclosure uses a Field-Programmable Gate Array (FPGA) 499 and an example program of a cyclical shift register 300 out of flip-flops 305, 315, 325 shown in FIG. 3 that consists of a large number of inverters 400, 405, 410, 415 connected in parallel as shown in FIG. 4, where A, B, C, D designations illustrate sets of inverters operating at a same modulation frequency. As shown in FIG. 3, a shift register 300 is a group of flip-flops 305, 315, 325 set up in a linear fashion with their inputs and outputs connected together such that the data is shifted from one device to another when the circuit is active. FIG. 3 illustrates use of linear feedback shift registers (LFSRs), i.e., the shift register 300 connects the most significant bit, MSB (FFN in FIG. 3) back to the least significant bit, LSB (FF1 in FIG. 3) to cause the function to endlessly cycle through a sequence of patterns.

A simplified internal structure of an FPGA chip is shown in FIG. 4A where logic blocks are arranged in a two-dimensional grid and are connected by a programmable routing inter-connects. This symmetrical grid is connected to I/O blocks 480 which make off-chip connections. The "pro-grammable/re-configurable" term in FPGAs indicates their ability to implement a new function on the chip after its fabrication is complete. Logic blocks can be simplified as programmable flip-flops 425 shown in FIG. 4B. Most flip flops are based on CMOS-NAND gates due to their low latency. An equivalent output circuit 450 of a CMOS-NAND gate is shown in prior art FIG. 4C. When input voltage is low, NMOS transistors are off and PMOS transistors are on. A direct path exists between Vout and VDD, resulting in a high output state. On the other hand, high input results in a low output state. This change between states with different impedance creates a difference in the circuit's radar cross section (RCS) and thus modulates the electronic backscatter signals.

Figure 5:
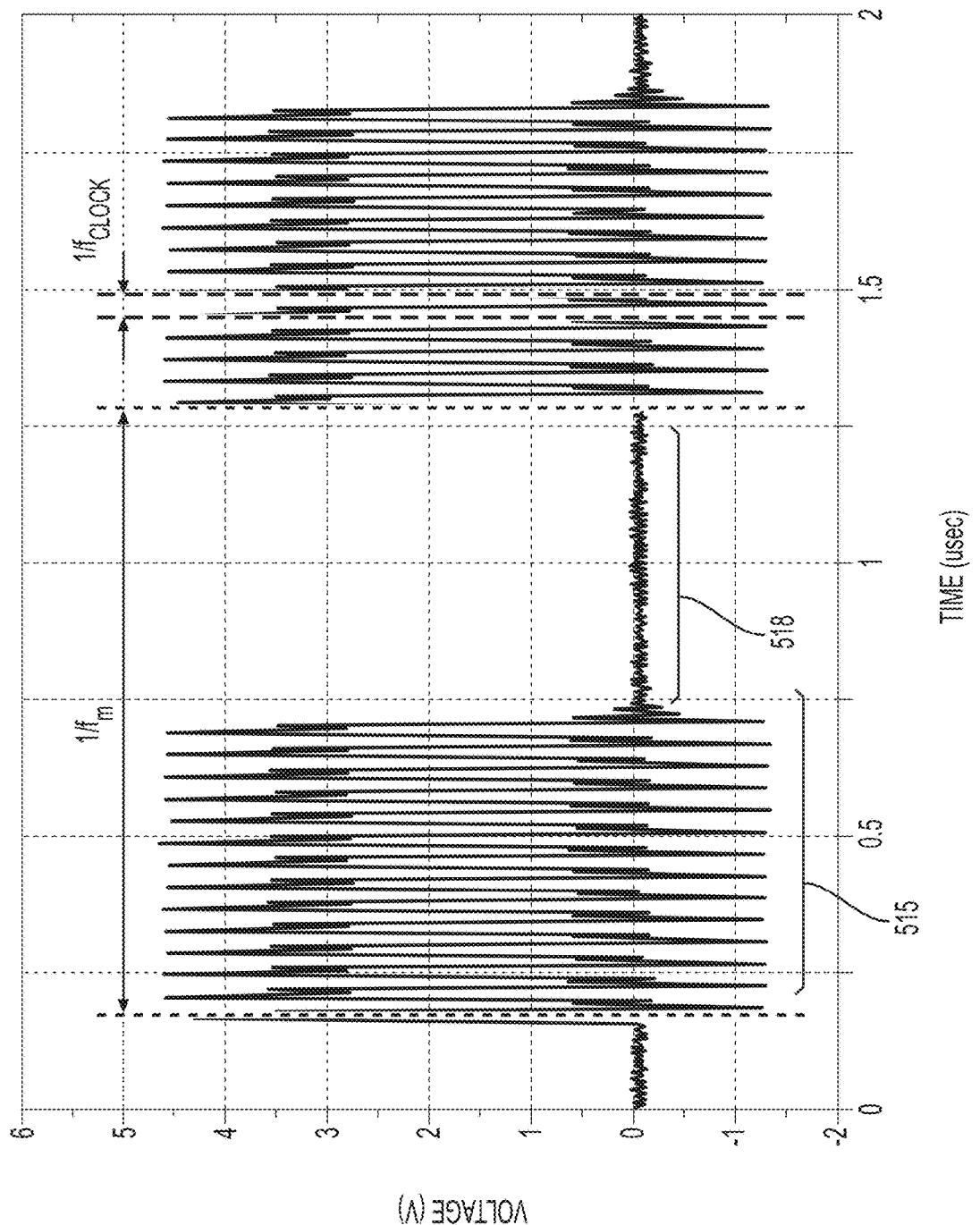
FIG. 5 is an illustration of the relationship between the modulation period ($1/f_m$) and the clock period ($f/f_{clock}$) in a circuit of flip-flops switching in a switching signal pattern at $f_m$=900 kHz.

In order to modulate an incident carrier wave (CW) signal, this disclosure illustrates flip-flops programmed to switch in a pattern shown in FIG. 5. Flip-flops continuously switch between high state and low state at a clock frequency (fclock), such as but not limited to 50 MHz for half of a cycle 515 and stay quiet for the other half the cycle 518. The switching cycle (modulating frequency, fm) directly relates to the modulated signal bandwidth, i.e., the first harmonic of the modulated backscatter signal will be located at fcarrier±fm. By changing fm, one can upshift or downshift the modulated signals, making design very flexible. Note that fm should be selected to avoid undesired harmonics in higher frequencies, i.e., the highest sideband (fm) needs to be less than three times of the lowest sideband (fm), and to comply radio regulations and avoid interference from other radio systems. Please note that in practice, the switching transistors do not produce ideal square pulses but rather pulses that have rising edges 2200A and falling edges 2200B shown in FIG. 22 for example, which sometimes lead to appearance of signals at even harmonics of the modulated backscatter signal. To avoid undesired interference, the highest sideband (fm) should be less than two times of the lowest sideband (fm).

Other digital units that have periodic behavior, such as voltage regulators, are also candidates for use in developing an antenna-less tag and typically produce signals in frequency ranges much lower than a processor clock. One of the reasons for that is to minimize interference between periodic activities that tend to produce multiple harmonics on the board. When designing RFID, knowledge of frequencies of periodic activities on the board will help determine where to position frequencies of RFID modulated sidebands. The potential interfering frequencies caused by other digital units can be found using method proposed in reference [28] noted below.

Figure 6:
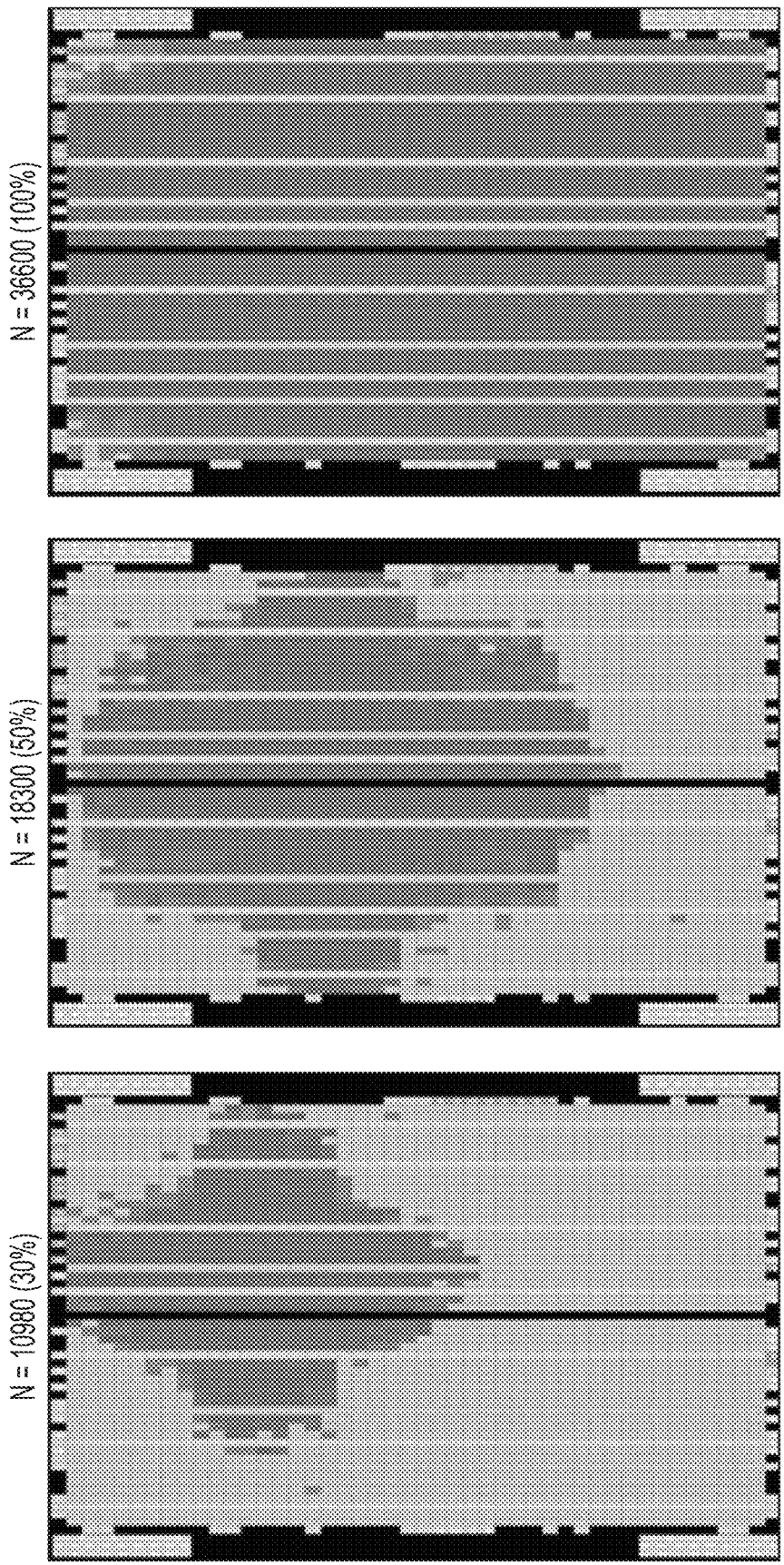
FIG. 6A is an illustration of a first logic utilization mapping of an exemplary FPGA chip as described herein.
FIG. 6B is an illustration of a second logic utilization mapping of an exemplary FPGA chip as described herein.
FIG. 6C is an illustration of a third logic utilization mapping of an exemplary FPGA chip as described herein.

In addition to the switching pattern, the number of simultaneously-switched elements is another factor that affects electronic backscattering modulation. The more flip-flops are switching in unison, the stronger the backscatter signal is. To control the number of elements that switch simultaneously, one example embodiment use an N-bit shift register shown in FIG. 3, where N can be used to control the number of simultaneously-toggled flip-flops. FIG. 3 shows a simplified schematic for a 3-bit shift register, created by connecting N=3 flip-flops (FFs) 305, 315, 325. FIG. 6 shows how logic is mapped onto an Altera Cyclone V FPGA chip for different values of N. Dark blue blocks represent utilized resources (flip-flops and logic) while light blue blocks denote unused resources. This Cyclone V FPGA chip is completely utilized (100% design in FIG. 6) when N=36600, and designs with 50% and 30% utilization use N=18300 and N=10980, respectively. Note that other FPGA chips may contain different numbers of programmable elements (total available N), so the same utilization percentage may require different values of N to be selected when using other FPGA chips.

The proposed RFID tag operates the same as traditional RFID when only one inverter is used to create two impedance states, i.e., only a single-bit single-sideband transmission is created. However, when higher data rate is needed, traditional RFID uses multiple amplitude and/or phase levels and multi-bit modulation schemes to transmit the message in a single-sideband transmission. With dedicated ASIC, the proposed RFID can be designed in a similar fashion. However, it is also possible to have multiple inverters 400A-D, 405A-D, 410A-D, 415A-D in the FPGA 499 that switch at different frequencies, allowing for dynamic or static multi-bit designs using frequency modulation as shown in FIG. 4. The advantage of multi-frequency design is that receiver design is much simpler. For example, it does not require channel equalization and synchronization and detection is much simpler. To generate multiple bits as demonstrated herein, multiple shift registers 700, 715, 725 in FIG. 7 are used to switch at different fm. Parameter M' represents the number of total shift registers. Parameter $N_{M'}$ denotes the number of total configured flip-flops in the $M'^{th}$ shift register. The more flip-flops are configured for a given bit's information data channel 730A, 730B, 730C, the higher SNR can be achieved. Parameter $f_{mM'}$ is the modulating frequency of the $M'^{th}$ shift register, which affects the location of each side band and corresponding bandwidth for the communications. FIG. 7 illustrates that a digital circuit 750 comprising switching components 700, 715, 725 operating within an interrogation range of an incident carrier wave may include a plurality of input connections D and output connections Q directing data communications through the switching components within the digital circuit, wherein the data communications are subject to switching operations of the switching components between at least one of the input connections and at least one of the output connections. A backscatter response 727 is reflected from the digital circuit upon arrival of an incident carrier wave (not shown), wherein the backscatter response is a modulated backscatter response in the presence of the switching operations.

Figure 8:
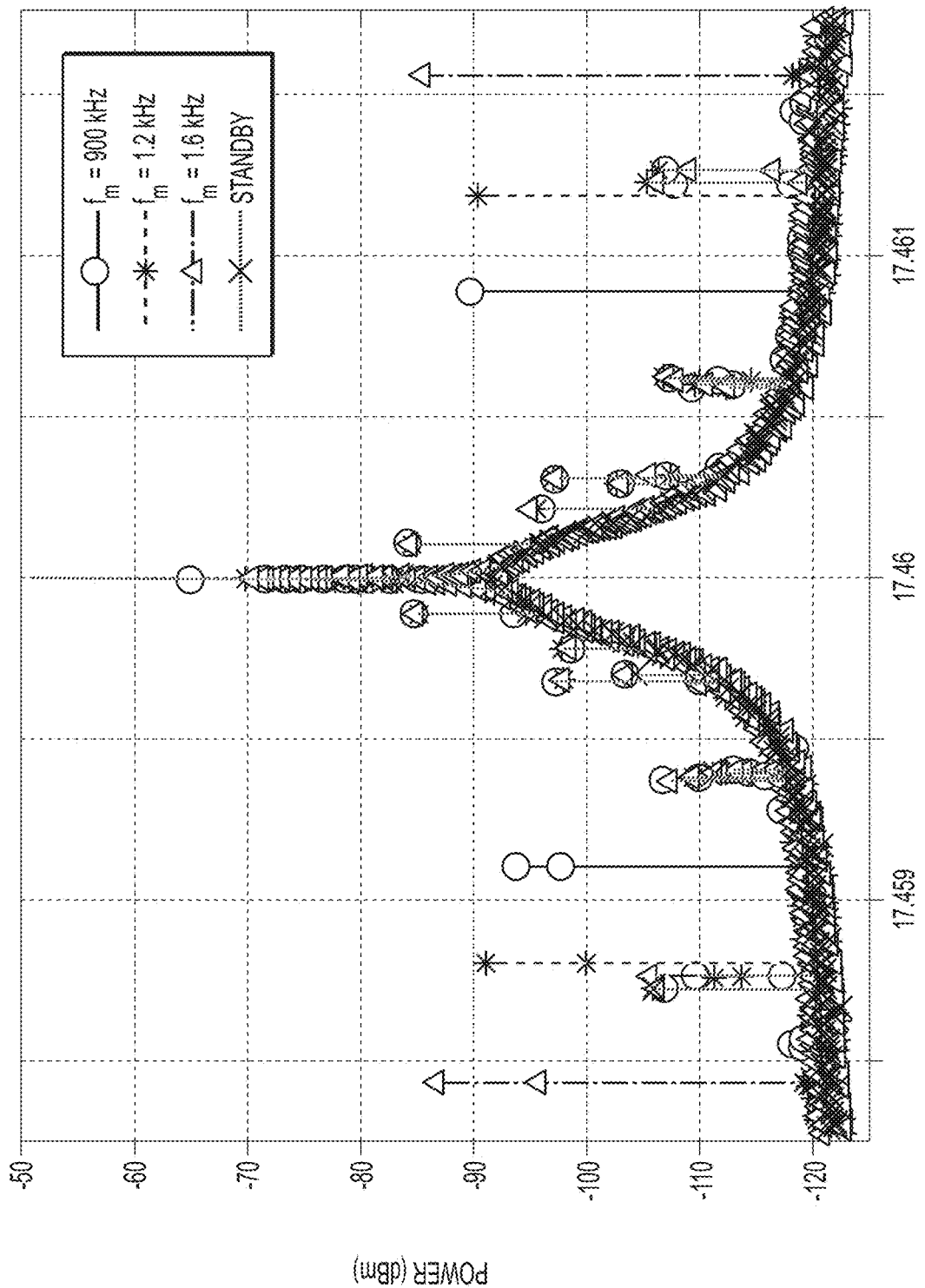
FIG. 8 is an illustration of an experimental result, showing the measured backscatter power at three different carrier frequencies and the backscatter frequency when an FPGA board is turned on, but not switching, and utilizing a low noise amplifier (GNA-130F) as applied herein. The different traces show measured backscatter power with fcarrier=17.46 GHz and fm=900 kHz (green), 1.2 MHz (red), and 1.6 MHz (yellow), respectively. The standby curve (blue) is the measured backscatter signal when FPGA board is turned on but not switching.

Next, this disclosure demonstrates that backscattered sidebands, such as those shown schematically at 727 in FIG. 7, are actually created by changing a switching frequency of the FPGA circuits, such as those shown in FIG. 4. The switching frequencies of the flip-flops in the FPGA board are varied from fm=900 kHz, to 1.2 MHz, and to 1.6 MHz with logic utilization of 100%. For one non-limiting example, measurement setup is presented in FIG. 12C. A low noise amplifier, GNA-130F from RF Bay Inc. [29] is used and Pt is 15 dBm. FIG. 8 shows the measurement results with fm=900 kHz (circle), 1.2 MHz (six-pronged star), and 1.6 MHz (triangle). The standby curve (X) is the measured backscattered signal when FPGA board is turned on but not switching. Distinct modulated sidebands are observed at 17.46 GHz±900 kHz, 17.46 GHz±1.2 MHz, and 17.46 GHz±1.6 MHz. Signal strength of the modulated sidebands reaches up to −85 dBm, which is sufficient for commercial-available RFID readers in references [30] and [31] with sensitivity of −120 dBm and −125 dBm to detect. This result shows that our proposed RFID technology can be used for commercial applications.

In the standby mode, other sidebands around 17.46 GHz are also observed. Since the measurement is conducted in an indoor office environment, these sidebands are results from surrounding interference, e.g., measurement instruments, LCD monitors, mobile phones, WiFi routers, etc. Note that conductive traces, such as those shown in FIG. 4, on an FPGA board that connect the FPGA chip 499 to GPIO pins may act as antennas and radiate the backscatter signal. We disconnect these traces to verify that the signal is coming from the FPGA chip itself and not from the board. When turned on, GPIO pins 480 can still operate correctly but will produce stronger RFID signal. Experimental results in FIG. 8 verify that switching electronics can establish backscattering channels without any antennas and RF front-end circuits.

The proposed tag does not have to be implemented in FPGA. Specialized circuits, e.g., ASICs, can be fabricated and the impedance difference between NAND logic's high output and low output state can be further optimized. This disclosure shows the possibility and feasibility of implementing the proposed RFID on ASIC to enhance backscatter signal strength. ASIC's NMOS/PMOS transistors with unbalanced on-state impedances can lead to larger RCS and thus increase the backscatter signal. In order to design ASIC that can effectively enhance the backscatter signal, first we need to understand the impedance model of the proposed RFID tag. Output impedance of a power supply network in integrated circuits is the parallel combination of output impedances of individual power-supply connections of all flip-flops [15]. The more flip-flops are connected, the more individual power supplies are connected in parallel, which reduces impedance. That is, the total input impedance of the proposed RFID tag is inversely related to the logic utilization N. Given this relationship between logic utilization and input impedance, we introduce a modulation loss factor, M, which relates the total tag's modulation loss to transistors' impedance variation. M can be expressed as, $$M(x\%) = \frac{1}{4} |((R1(x\%) - 377^*) \div (R1(x\%) + 377)) - ((R0(x\%) - 377^*) \div (R0(x\%) + 377))|^2 \quad (1)$$

where R1($x\%$) and R0($x\%$) are the estimated high state (1s) resistance and low state (0s) resistance of the FPGA chip. Parameter x represents the percentage of total logic resources being configured. R1($x\%$) and R0($x\%$) are defined as, $$R1(x\%) = (R1(10\%) \div (x\% \div 10\%)) + Rpkg \quad (2) \text{ and}$$

$$R0(x\%) = (R0(10\%) \div (x\% \div 10\%)) + Rpkg \quad (3)$$

R1(10%) and R0(10%) are the estimated high state (1s) and low state (0s) resistances of an FPGA chip where 10% of total resources are utilized. Rpkg is the estimated resistance contributed by the package of the IC chip, e.g., wire bonds inside the chip case. The input impedance of the tag is equal to free space impedance, 377Ω, since there is no antenna but only air at the interface between the carrier signal and FPGA chip. Note that total impedance may also be affected by GPIO pins. For all the RFID designs proposed in this paper, we disconnect the traces that connect the chip and GPIO pins, and thus, GPIO pins do not affect the impedance variation created by the switching transistors. As a result, the proposed impedance model in (1) does not include the influence from GPIO pins. According to reference [27], typical values of R0 and R1 are in kΩ range and the values of R0 and R1 are inversely proportional to the W/L ratio of the device (ratio of width and length). Therefore, by tuning transistor's W/L ratio, one can control the values of R0 and R1, modulation loss factor M, and the corresponding backscatter power. In order to estimate R0(10%), and R1(10%), this disclosure first configures the FPGA 499 of FIG. 4 with a carrier wave frequency of 17.46 GHz, modulating frequency fm=900 kHz and logic utilization varying from 10% to 100% In one non-limiting example of this disclosure, the experiment measures the corresponding backscattered power at 17.46 GHz+900 kHz. Next steps include performing curve fitting to estimate the optimal value of (R0(10%), R1(10%)) as (18.8 kΩ, 20.4 kΩ), which is within reasonable range as noted in Reference [27].

Figure 9:
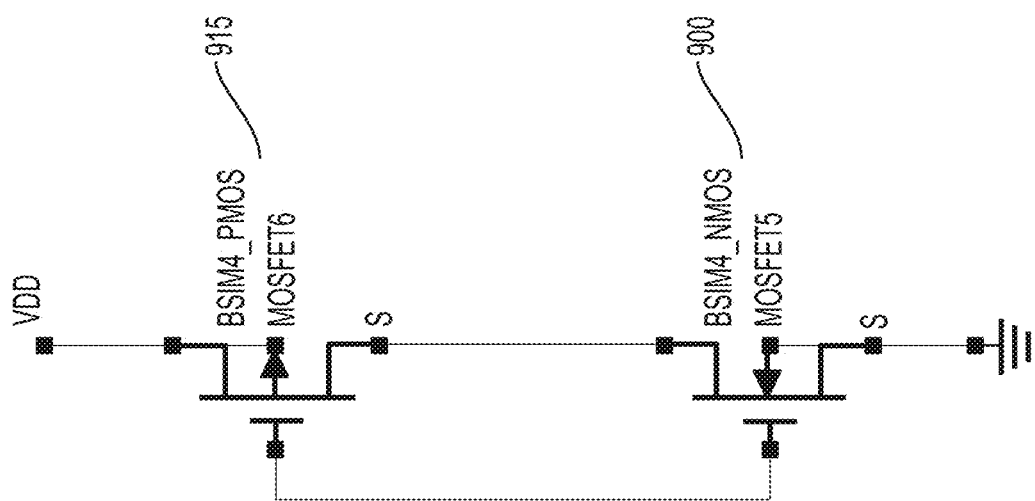
FIG. 9 is a diagram of an exemplary CMOS driver circuit based on NMOS and PMOS transistor models as set forth in examples of this disclosure.
Figure 10:
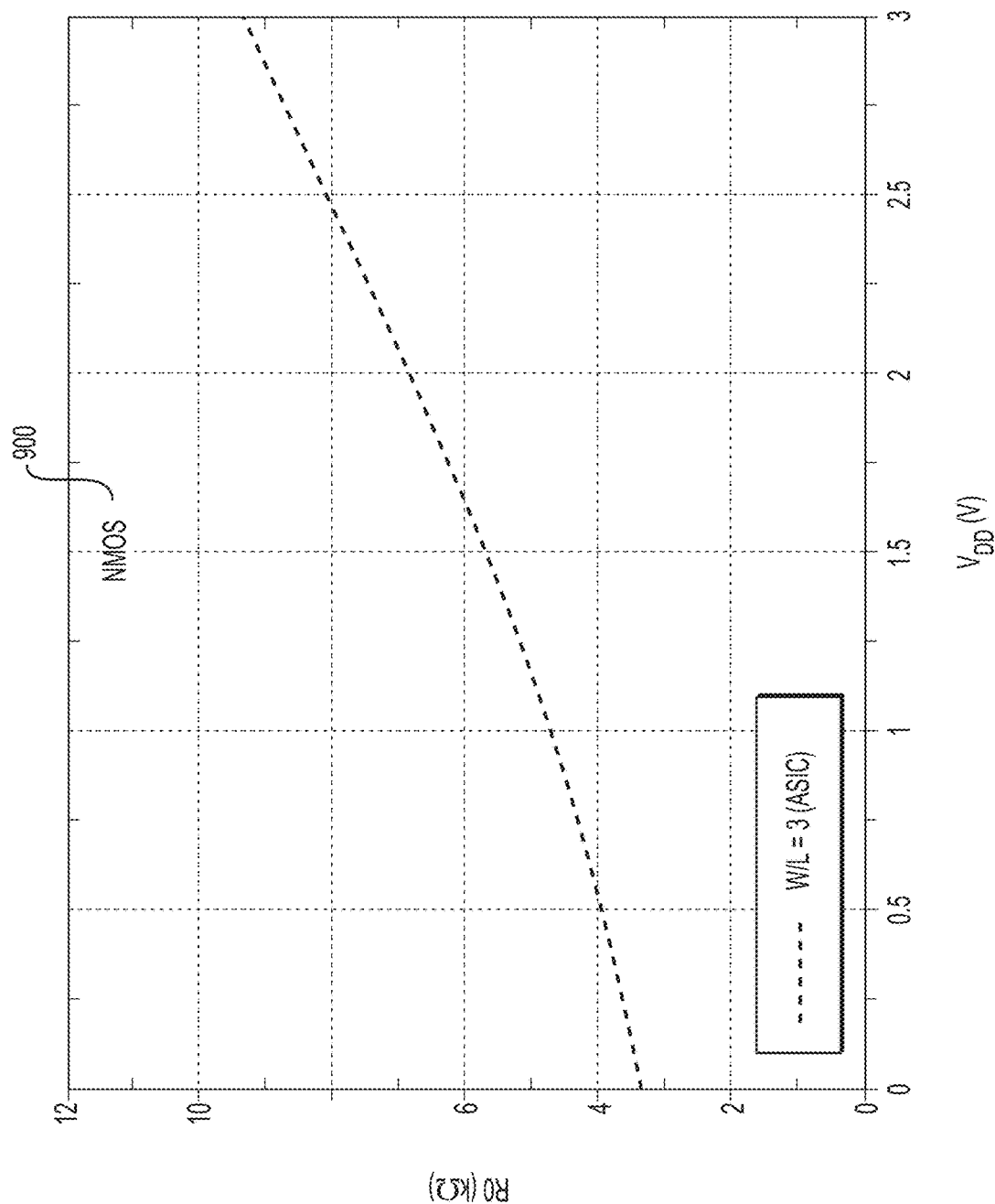
FIG. 10 is an illustration depicting the simulated on-resistance of an ASIC's NMOS transistor with (W, L)=(0.48 um, 0.16 um) as VDD sweeps from 0 V to 3 V.
Figure 11:
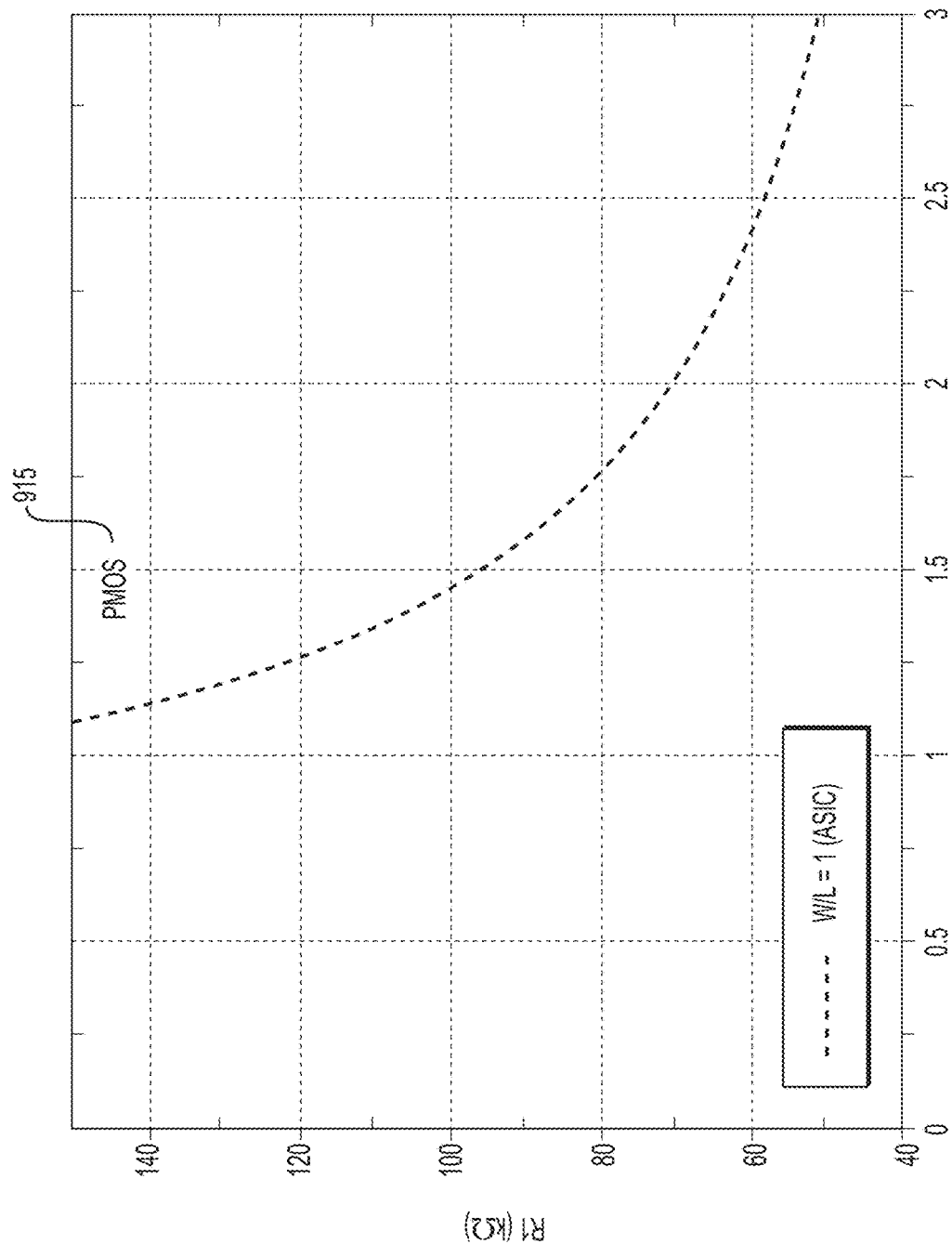
FIG. 11 is an illustration depicting the simulated on-resistance of an ASIC's PMOS transistor with (W, L)=(0.16 um, 0.16 um) as VDD sweeps from 0 V to 3 V.

The estimated value of Rpkg is found to be in the range of several ohms based on the dimensions of the wire bonds provided by [32] and the formulae in reference [33]. It is found that Rpkg has very minor impact to the total resistance since Rpkg is in the range of several ohms while R0 and R1 are in the kilo-ohm range. Next, by using (1), one can estimate the value of M for the FPGA processor as −39.1 dB. We have designed an ASIC with (R0, R1)=(6 kΩ, 100 kΩ), and M=−9.1 dB. Comparison of modulation loss factor M between the current FPGA processor and the proposed ASIC design is summarized in Table I. Accordingly, one can observe that by increasing the difference between ASICs' two impedance states R0 and R1, modulation loss factor M and the backscatter power can be effectively enhanced by 30 dB. Next, this disclosure includes results of conducted simulation of MOSFET transistors with Keysight Advanced Design System to demonstrate that the proposed ASIC design in Table I can be achieved by tuning transistors' W/L ratios. Schematic design of the simulation is presented in FIG. 9. BSIM4 NMOS 900 and PMOS 915 transistor models similar to those of references [34], [35] are based on 0.16 um process, i.e., the minimum length of gate (L) of a transistor is 0.16 um. FIGS. 10 and 11 present the simulation results of the R0 of NMOS transistor 900 and R1 of PMOS transistor 915 with different W/L ratios as the drain voltage (VDD) sweeps from 0 V to 3 V. Results show that the proposed ASIC design (third row in Table I) with (R0, R1)=(6 kΩ, 100 kΩ) can be achieved by using (W/L) NMOS=3, (W/L)PMOS=1, and VDD=1.5 V.

TABLE 1

COMPARISON OF MODULATION LOSS FACTOR (M)

| Designs | (R0, R1) (kΩ) | Logic Utilization | M | Enhancement of M |
|---|---|---|---|---|
| Current FPGA | (18.8, 20.4) | 100% | −39.1 dB | +0 dB |
| ASIC | (6, 100) | 100% | −9.1 dB | +30 dB |

Figure 12A:
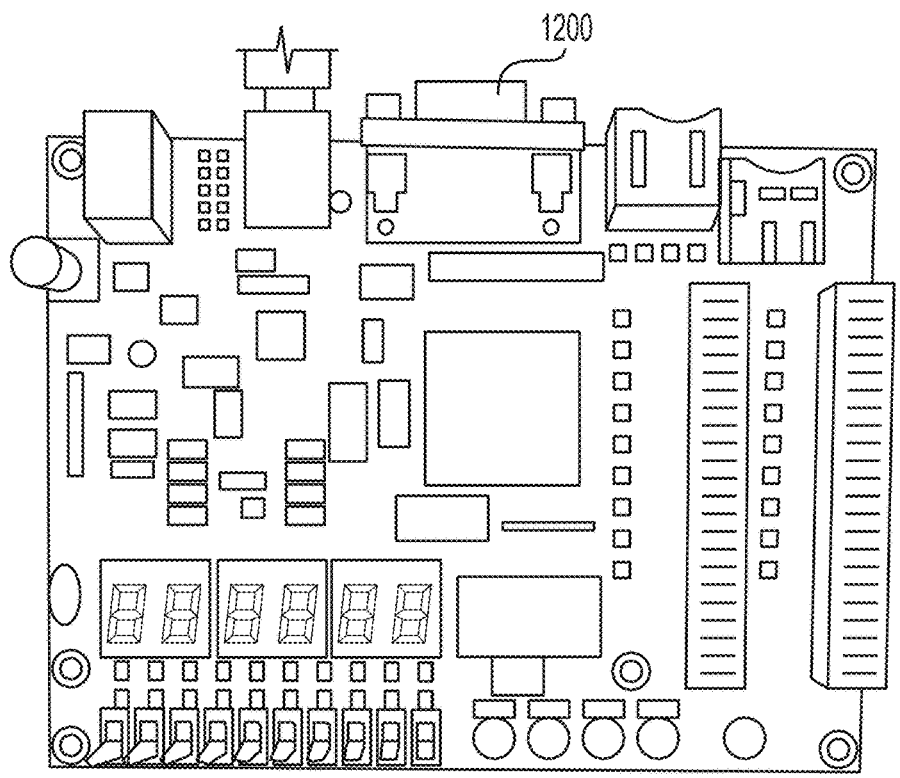
FIG. 12A is a depiction of a test configuration including an Altera Cyclone V FPGA board as used in examples of this disclosure.
Figure 12B:
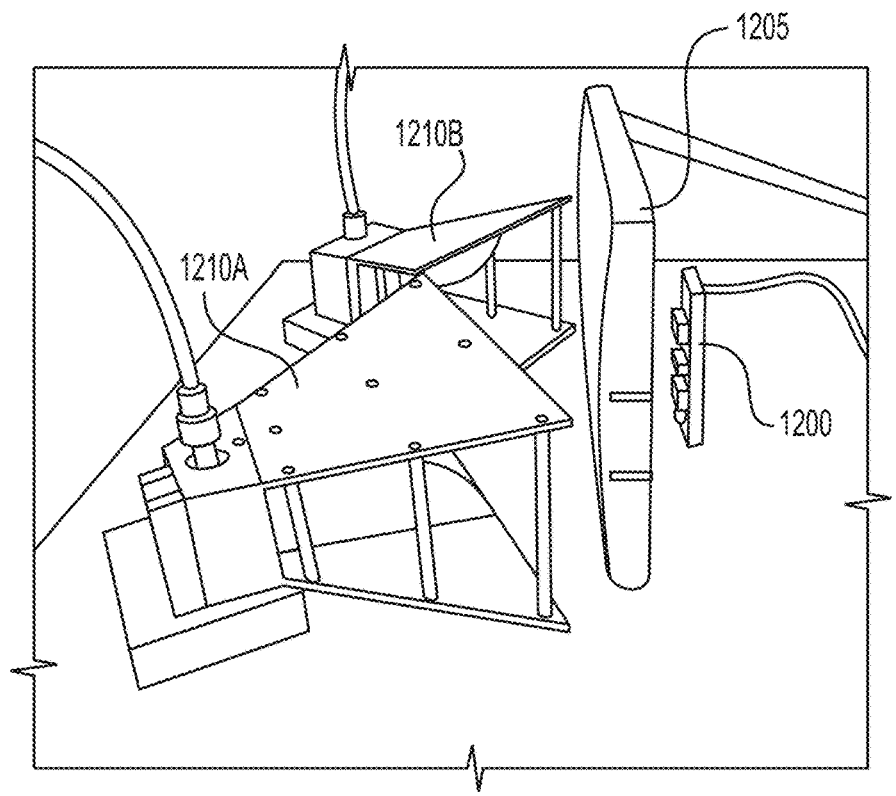
FIG. 12B is a depiction of a test configuration for example measurement setups for a carrier wave having a carrier frequency of 5.8 GHz.
Figure 12C:
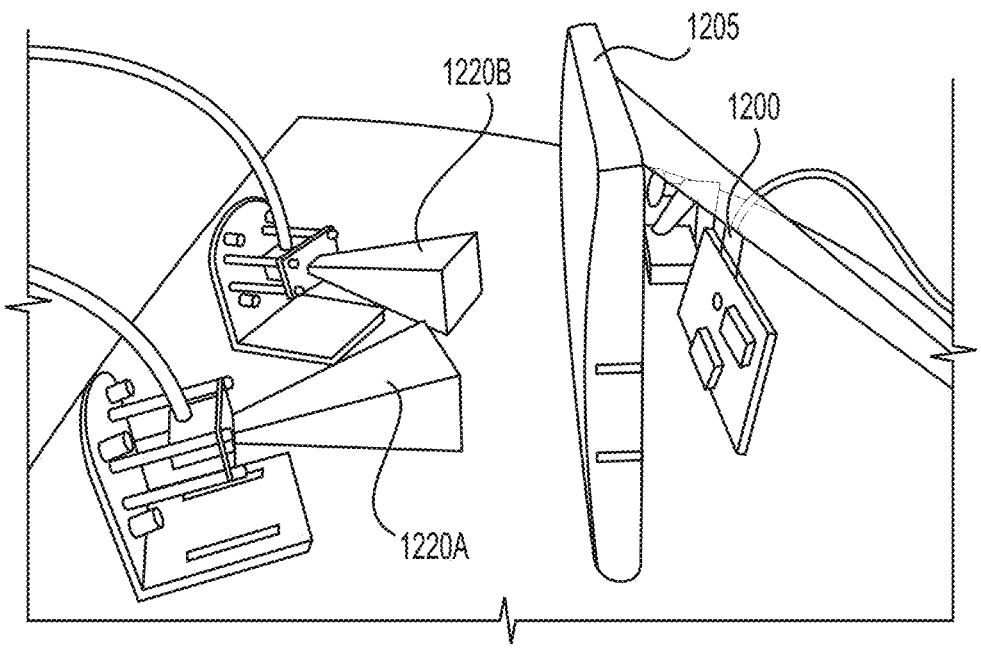
FIG. 12C is a depiction of a test configuration for example measurement setups for a carrier wave having a carrier frequency of 17.46 GHz.
Figure 12D:
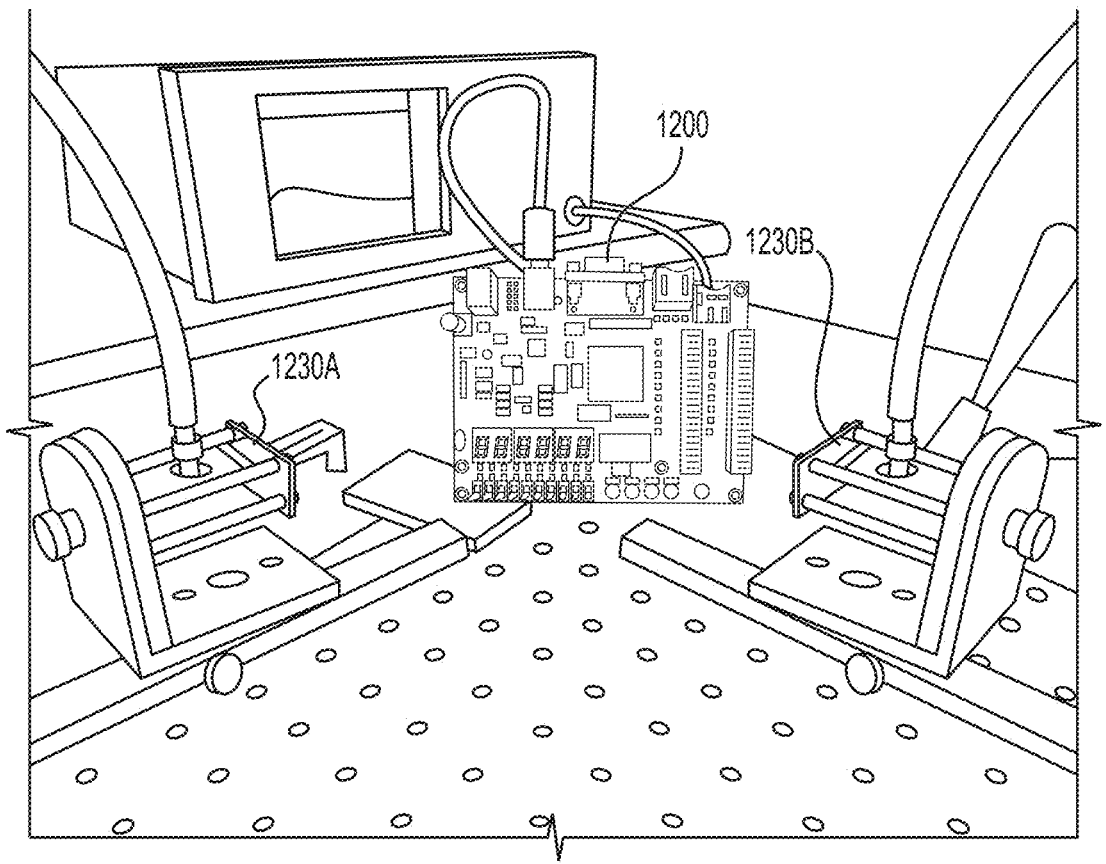
FIG. 12D is a depiction of a test configuration for example measurement setups for a carrier wave having a carrier frequency of 26.5 GHz.

An Agilent MXG N5183A Signal Generator with input power of 15 dBm (31.6 mW) is used as a signal source and an Agilent MXA N9020A Vector Signal Analyzer is used to record the signals. An Altera DE0-Cyclone V FPGA board 1200 is used as the RFID tag as shown in FIG. 12A. For interrogation, this non-limiting example uses double ridge horn antennas 1210A, 1210B (Com-Power AH-118) shown in FIG. 12B for 5.8 GHz measurements. Double ridge horn antenna operates from 0.7 GHz to 18 GHz with average isotropic gain of 10 dBi. FIG. 12C shows measurement setup with WR-62 standard gain horn antennas 1220A, 1220B (PE9854/SF-20) that operate from 12.4 GHz to 18 GHz with average isotropic gain of 20 dBi. Finally, FIG. 12D shows measurement setup with horn antennas 1230A, 1230B (A-INFO LB-28-10) operating from 26.5 GHz to 40 GHz with average isotropic gain of 10 dBi. Note that in FIGS. 12B and 12C, a 3-mm thick plastic case 1205 is placed between the Tx/Rx and the FPGA board 1200 to demonstrate that the proposed RFID tag can be potentially integrated into electronic devices with plastic enclosures, e.g., laptops, smartphones, tablets, etc. Note that the experiments show use of different horn antennas because none of them cover all frequencies of interest, i.e., 5.8 GHz, 17.46 GHz, and 26.5 GHz.

Figure 13:
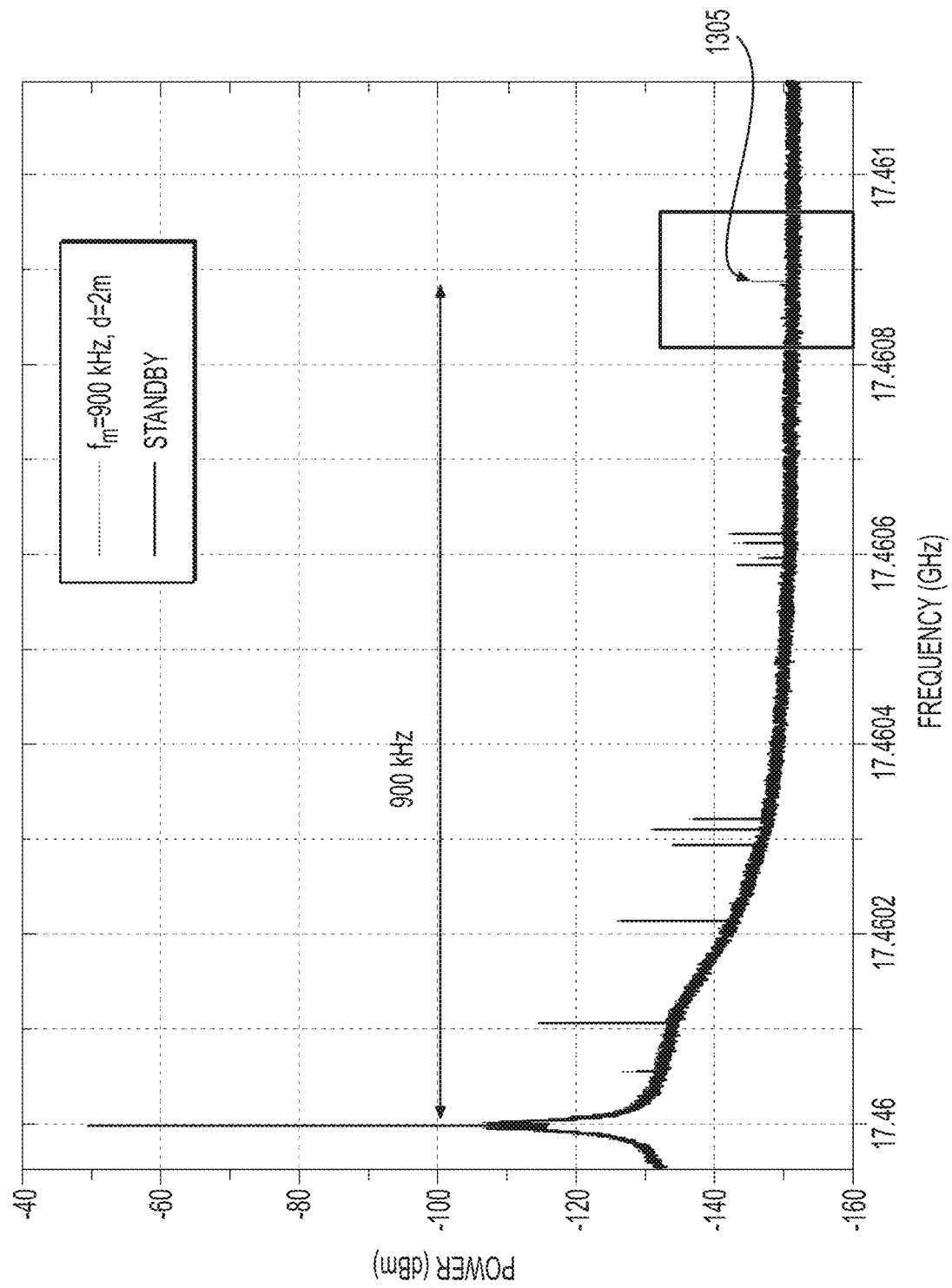
FIG. 13 is an illustration of experimental results showing the measured power of a 1-bit RFID with 100% logic resources, measured at 2 meters, with a carrier frequency of 17.46 GHz and a modulation frequency of 900 kHz.
Figure 14:
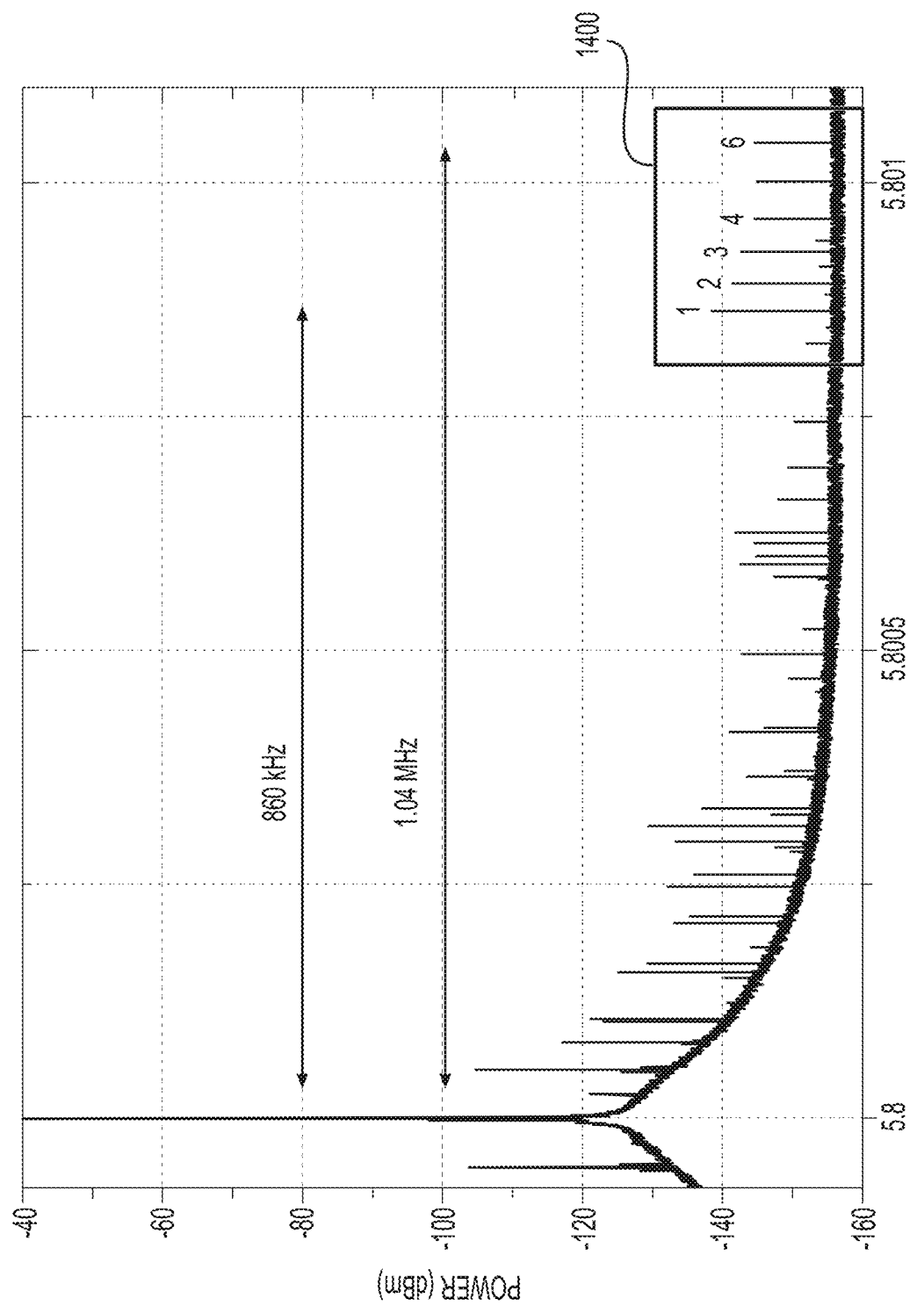
FIG. 14 is an illustration of experimental results showing the measured power of a 6-bit static ID RFID with 16% of logic resources assigned to each bit. The modulation frequency ranges from 860 kHz to 1.04 MHz.
Figure 15:
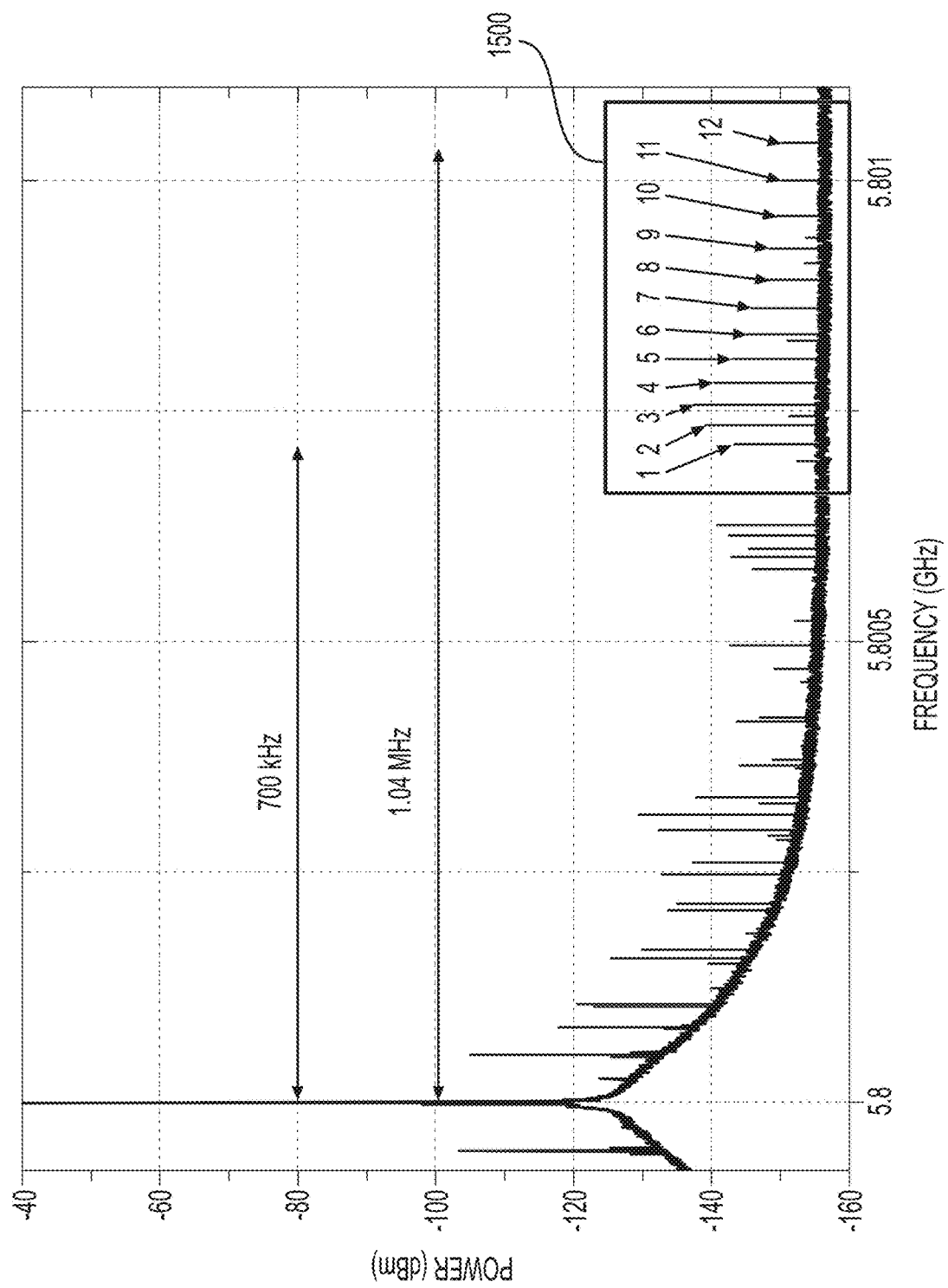
FIG. 15 is an illustration of experimental results showing the measured power of a 5.8 GHz 12-bit static ID with 8% of logic resources assigned to each bit, with the modulation frequency ranging from 700 kHz to 1.04 MHz.
Figure 16:
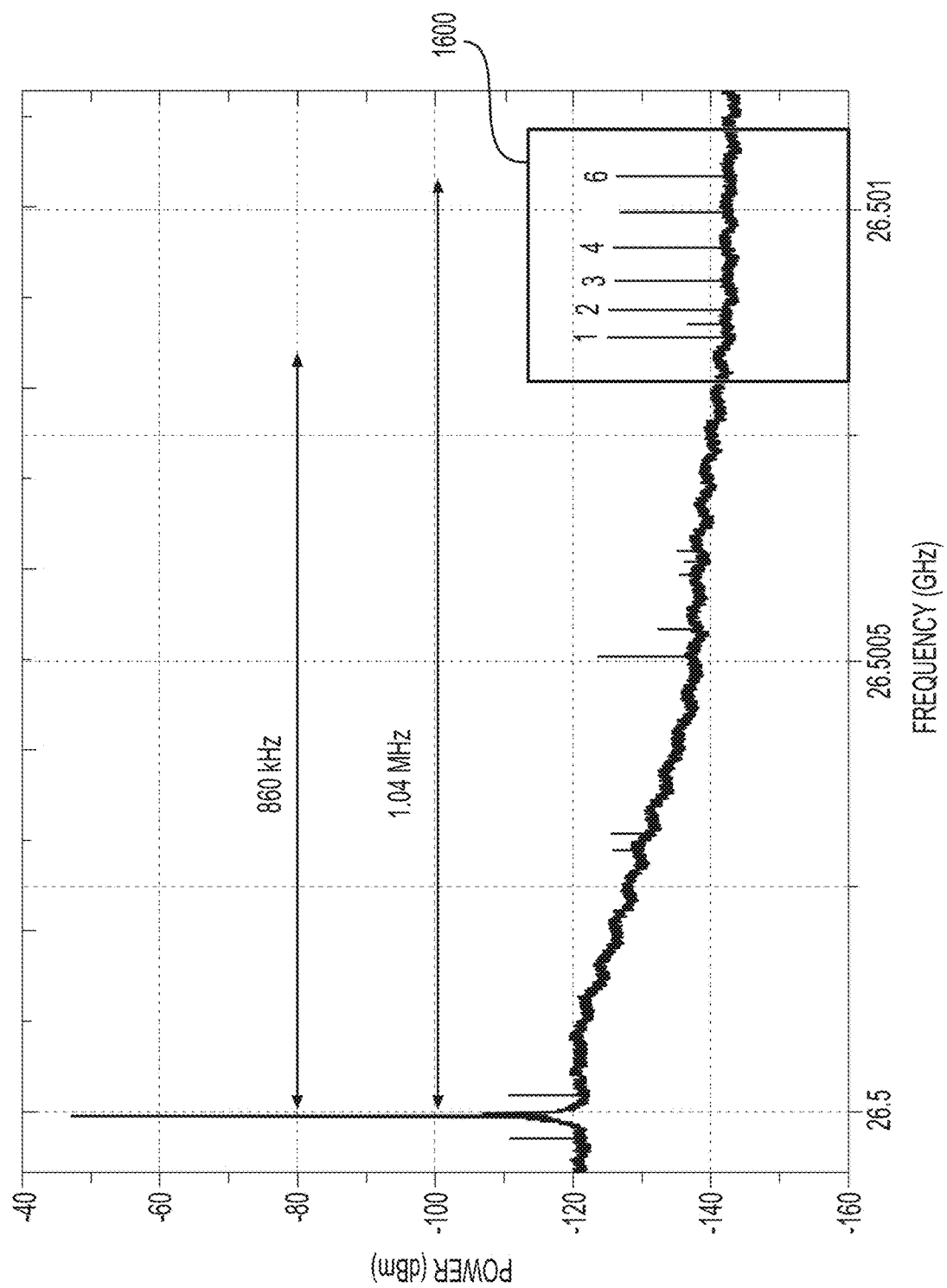
FIG. 16 is an illustration of experimental results showing the measured power of a 6-bit static ID with 16% of logic resources assigned to each bit, with the modulation frequency ranging from 860 kHz to 1.04 MHz.
Figure 17:
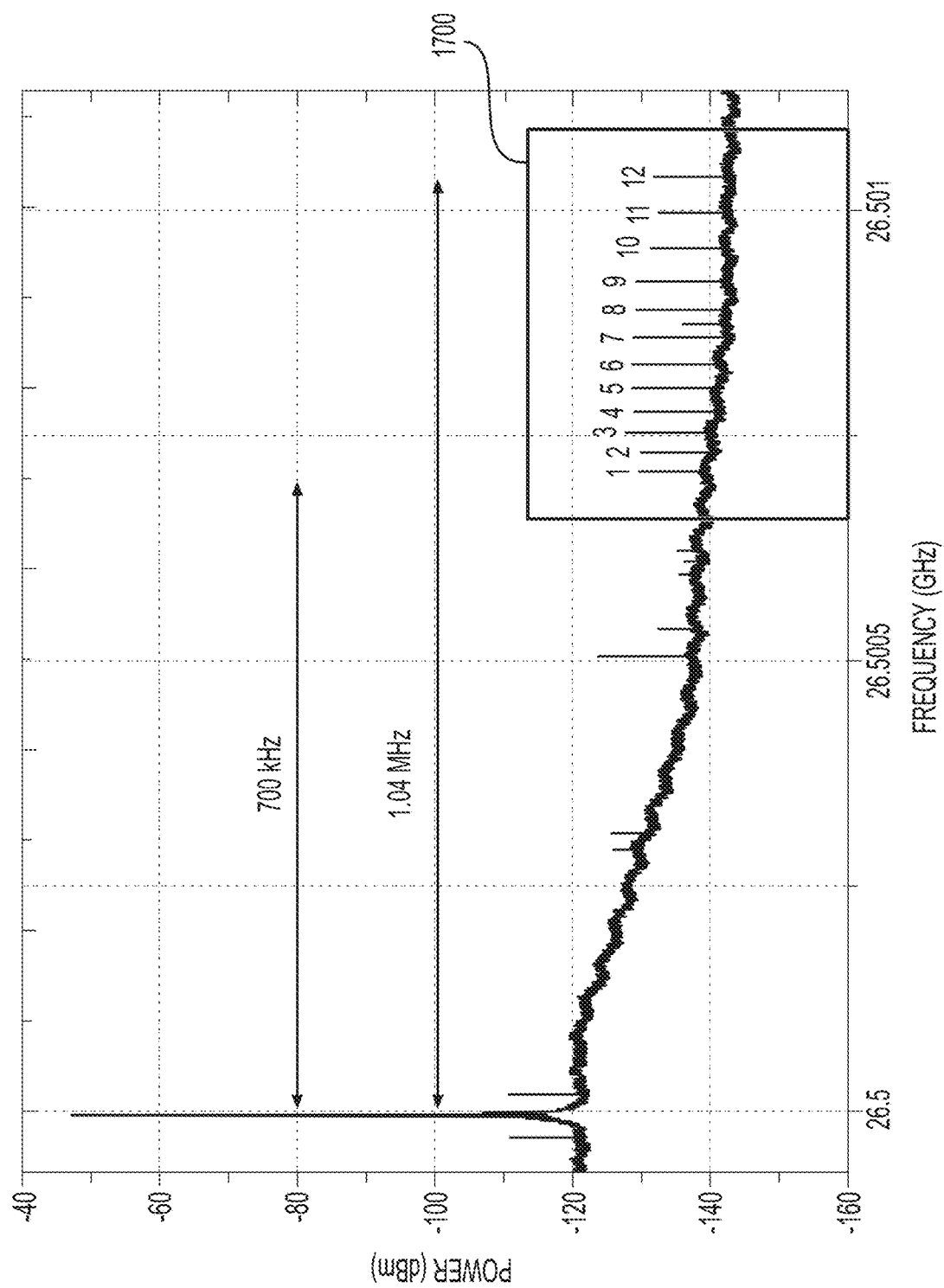
FIG. 17 is an illustration of experimental results showing the measured power of a 12-bit static ID RFID with 8% of logic resources assigned to each bit with the modulation frequency ranging from 700 kHz to 1.04 MHz.
Figure 18:
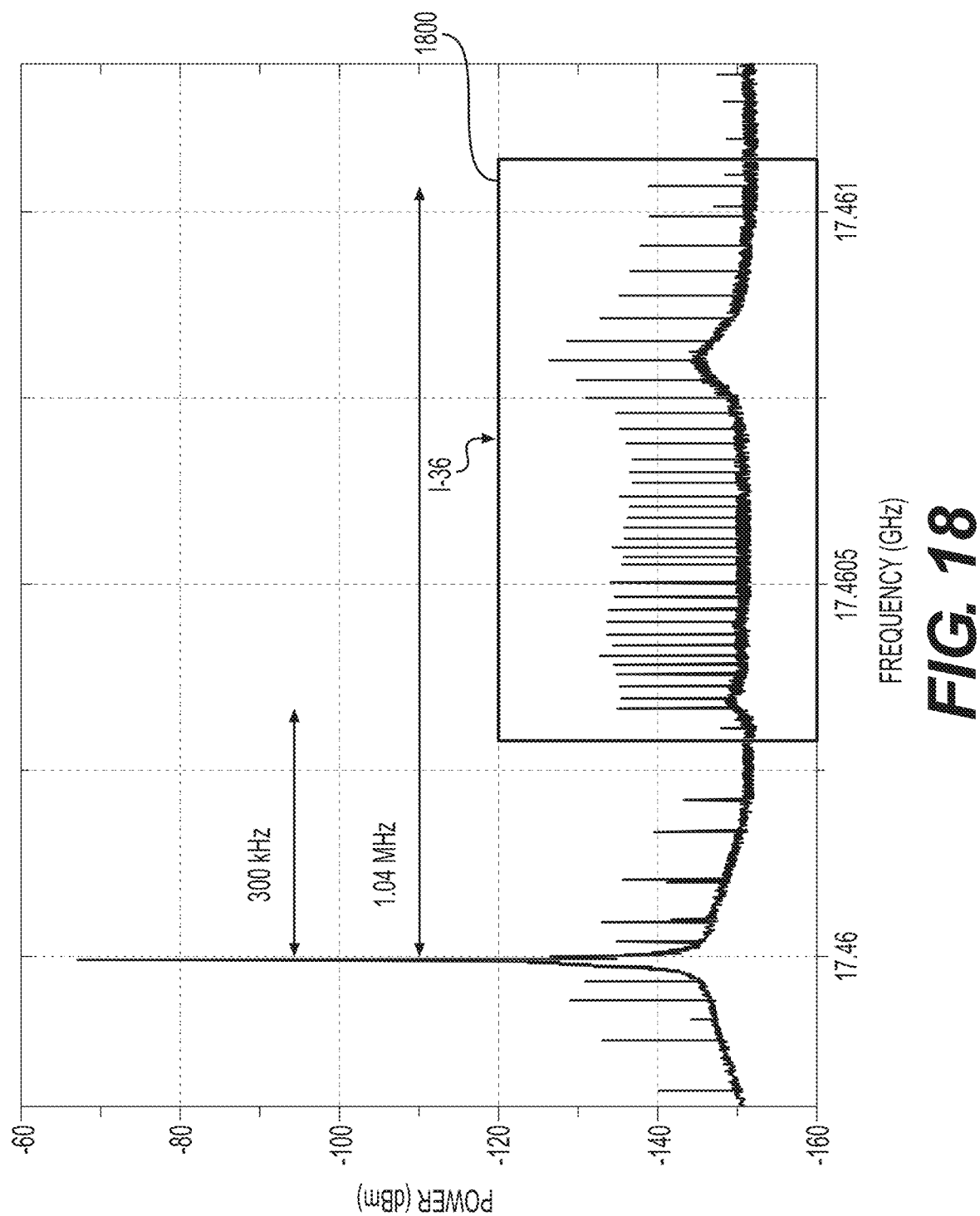
FIG. 18 is an illustration of experimental results showing the measured power of a 36-bit static ID with 2.7% of logic resources assigned to each bit with the modulation frequency ranging between 300 kHz to 1.04 MHz.

This disclosure also illustrates investigations directed to the optimal carrier frequency ($f_{carrier}$) to interrogate the proposed RFID tag and the maximum distance at which the signal can be received. The measurement setup in FIG. 12G has a transmission power Pt=15 dBm and modulation frequency fm=900 kHz. After sweeping carrier frequencies from 1 GHz to 18 GHz, researchers have found that the highest SNR is around 40 dB in the frequency range between 17 and 18 GHz. To test how far away a reader can receive backscattered signal, this disclosure shows results that configured a 1 bit RFID with 100% logic utilization in order to maximize the SNR and to achieve longer distance. The FPGA board was placed at 2 m away from the carrier wave transmitter Tx and interrogation receiver Rx. The fcarrier is set at 17.46 GHz with Pt=15 dBm and fm=900 kHz. FIG. 13 shows the measured backscatter signal at a distance of 2 m. It is observed that the sideband 1305 appears at fcarrier+900 kHz with SNR around 5 dB. Empirically, experiments have determined that a minimum 2.7% of total logic resources is needed to provide one observable sideband (bit) with SNR around 3 dB at Tx/Rx-to-tag distance=20 cm. This implies that an FPGA chip can be used for multiple tasks, i.e., enable RFID tag without interrupting normal function of the FPGA chip. For example, if an FPGA is configured for intense data processing, designers can reduce the number of bits and logic utilization of each bit, e.g., an 1-bit RFID allocated with 8% of total logic resources, leaving 92% of free logic resources for data processing; if an FPGA chip is mainly idle, designers can increase the number of bits and logic utilization of each bit, e.g., an 8-bit RFID with each bit assigned with 10% of total logic resources for higher SNR and data rate, leaving 20% of free logic resources for non-RFID activities, e.g., computing, DSP, etc. Therefore, there is great design flexibility while still supporting normal functionality of an FPGA-based system. Regarding power consumption, given an Altera Cyclone V FPGA configured at 100% logic utilization, a typical DC current consumption is 8.1 mA with a supply voltage of 1.1 V, which leads to a maximum power consumption of 9.5 dBm (8.91 mW) [36].

This disclosure further illustrates how the proposed RFID tag can be used for several different applications: 1) static IDs with 6, 12, and 36 bits; 2) dynamic multi-bit communications; 3) high data rate communications. The first application is static ID with 6 bits (FIGS. 14 and 16), 12 bits (FIGS. 15 and 17), and 36 bits (FIG. 18), respectively. The "static" term means that the designed bit pattern does not change over time, such as illustrated earlier in FIG. 3. Information stored on the tag depends on total number of bits. This disclosure shows that multiple shift registers designed as described in FIG. 7 configure multi-bit RFID design. For the 6-bit, 12-bit, and 36-bit RFIDs, fm is set in a range of 860 kHz-1.04 MHz (FIG. 14), 700 kHz-1.04 MHz (FIG. 15), and 300 kHz-1.04 MHz (FIG. 18) and 15%, 8.3%, and 2.7% of logic resources are assigned to each bit, which contributes a total logic utilization of 90%, 99.7%, and 97.2% and a corresponding power consumption of 9.04 dBm (8.02 mW), 9.49 dBm (8.88 mW), and 9.38 dBm (8.66 mW), respectively. Each bit can be turned on and off individually to generate binary signals is and 0s with up to 68.7 billion ($2^{36}$) combinations of unique IDs. The results demonstrate 6 bits and 12 bits static IDs at both 5.8 GHz and 26.5 GHz. The more bits are configured, the less logic resources are assigned to each bit, which requires higher antenna gain to accommodate lower SNR. As a result, experiments of this disclosure were able to observe signals for a 36 bits static ID (FIG. 18) only at 17.46 GHz because it had the highest SNR. Measurement results are shown in FIGS. 14-18.

One should note that the sideband power levels, e.g., 1400, 1500, 16,00, 1700, 1800 show respective bit transmission (1-6; 1-12; 1-36) at respective modulating frequencies within each range shown in FIGS. 14-18. It can be observed that all bits are clearly identified and separated at least 15 kHz apart with SNRs ranging from 6 dB to 20 dB, providing sufficient margins for signal detection. These example designs are not limiting of the disclosure but do demonstrate flexible carrier frequency selection and bits configuration. Note that in FIG. 18, due to attenuation, harmonics of lower sidebands do not cause observable interference to the higher sidebands. For the measurement setup, Pt is 15 dBm, Tx/Rx-tag distance is 20 cm. Note that the plastic enclosure as obstruction between the tag and the Tx/Rx can cause extra 1 to 2 dB attenuation. The measurement results shown in FIGS. 14-18 are without obstruction for better SNR demonstration.

Figure 19:
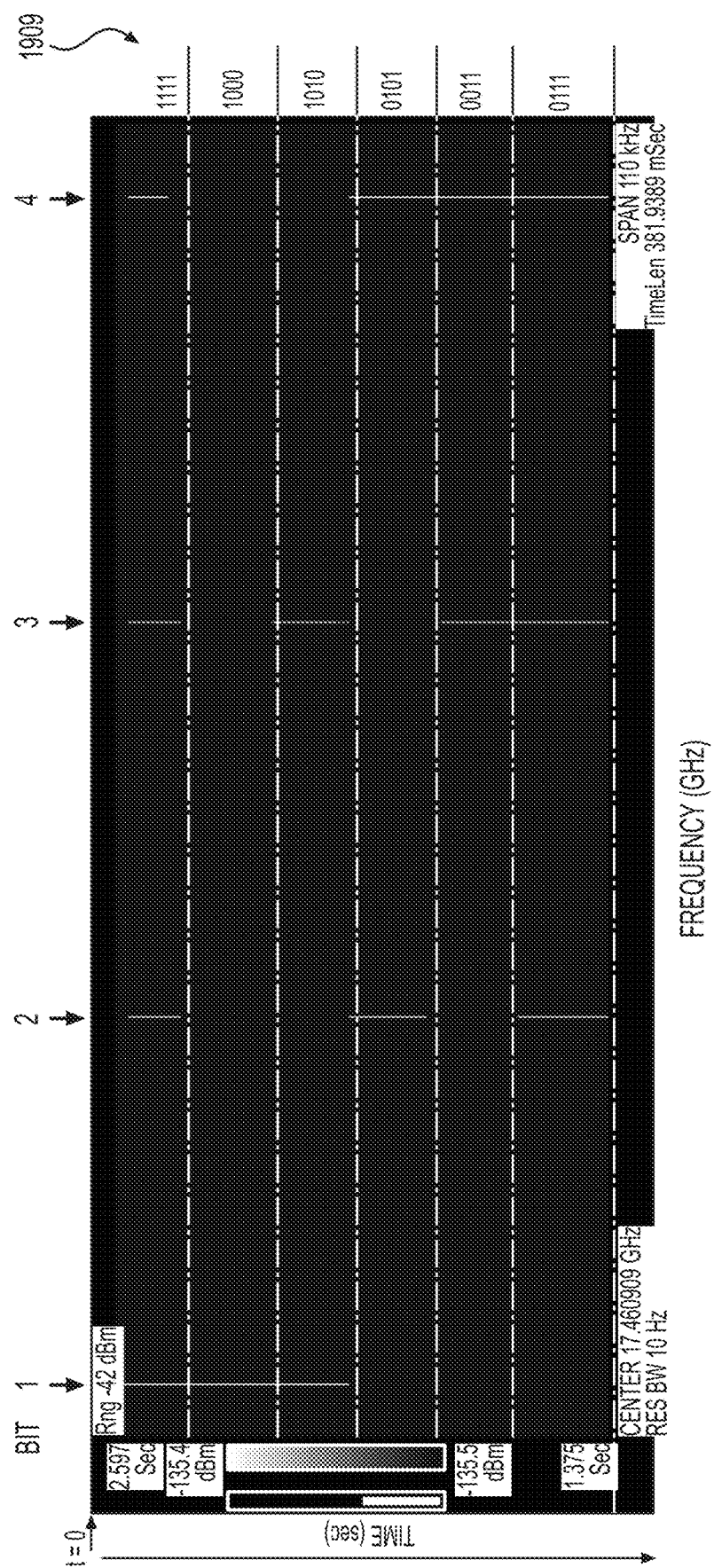
FIG. 19 is an illustration of experimental results showing the measured signal of a 4-bit RFID configured for dynamic communications where the modulation frequency ranges from 1 MHz to 1.14 MHz.
Figure 20:
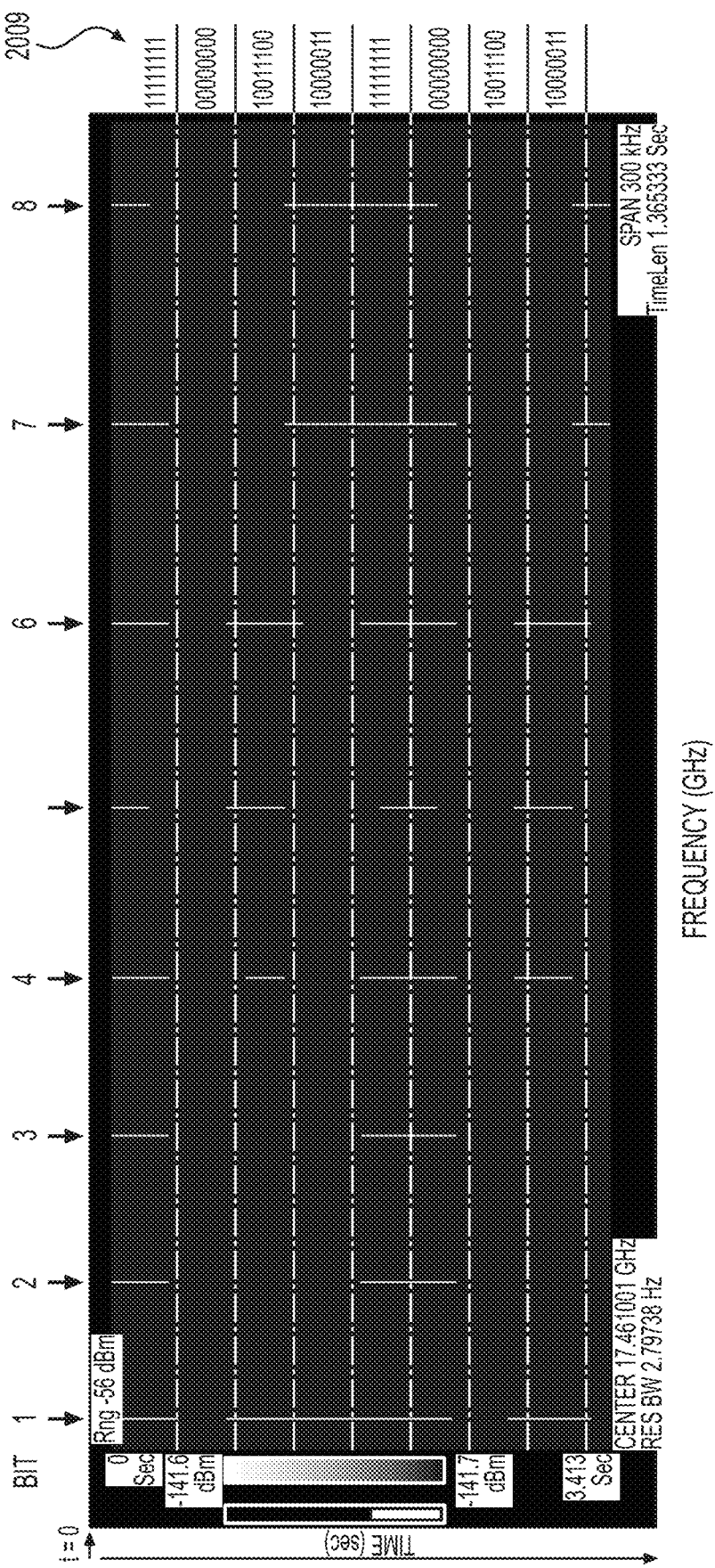
FIG. 20 is an illustration of experimental results showing the measured signal of an 8-bit RFID configured for dynamic communications where the modulation frequency ranges from 1 MHz to 1.39 MHz.
Figure 21:
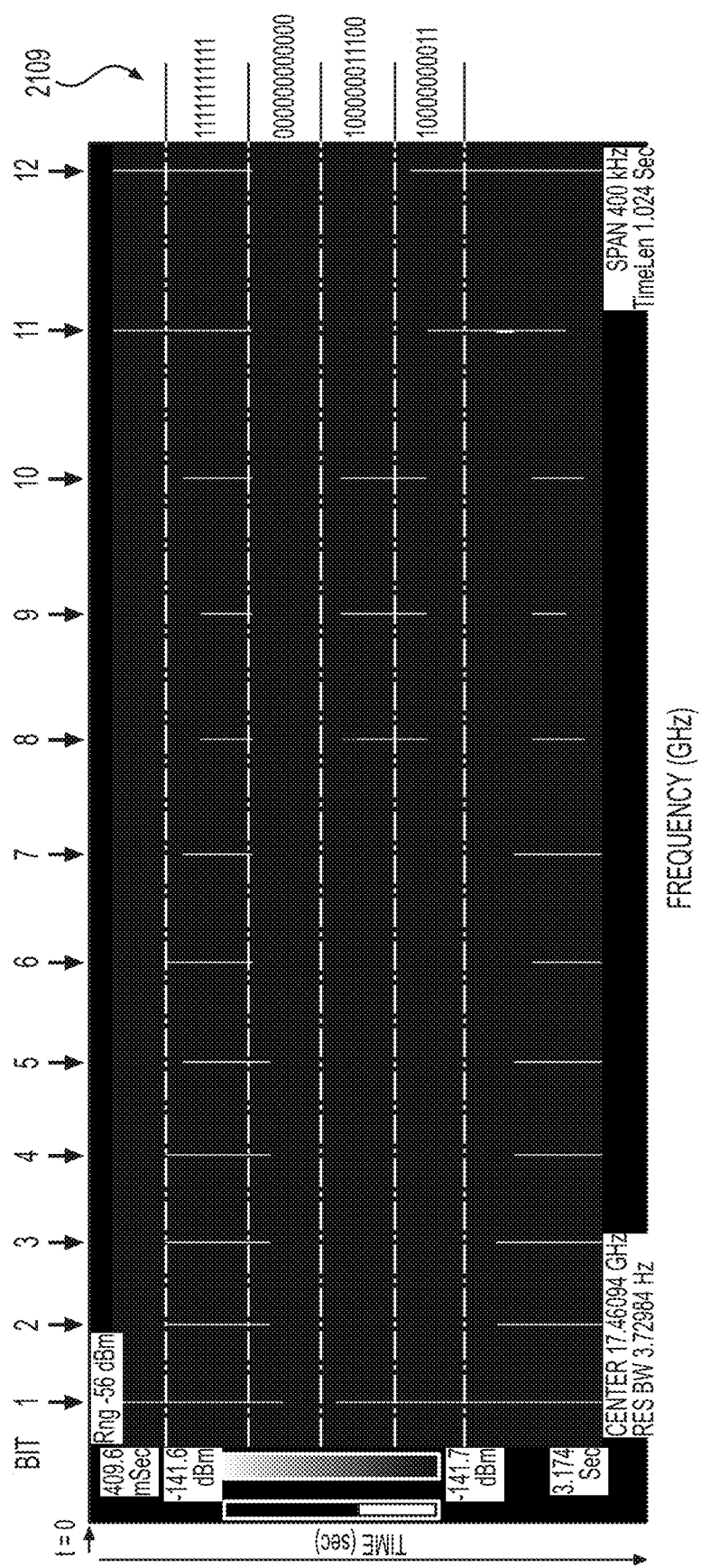
FIG. 21 is an illustration of experimental results showing the measured signal of a 12-bit RFID configured for dynamic communications where the modulation frequency ranges from 1 MHz to 1.79 MHz.

The second application is dynamic multi-bit communications. The "dynamic" term means the designed bit pattern changes over time. Compared to the static IDs discussed above here individual bit is turned on and off over time at a switching frequency (fs) to transmit information as shown in FIGS. 19-21. As a result, information stored on the tag is not limited by total number of bits but depends on fs and total transmitting time. We design 4-bit, 8-bit, and 12-bit RFID tags to transmit specific symbols and successfully detect the symbols at the receiver. Each bit is allocated with 8% of logic resources and fs is set at 100 Hz. Consequently, the 4, 8, and 12 bits designs have a total logic utilization of 32%, 64%, and 96%, a corresponding data rate of 400 bits/sec, 800 bits/sec, and 1.2 kbits/sec, and a corresponding power consumption of 4.55 dBm (2.85 mW), 7.56 dBm (5.7 mW), and 9.32 dBm (8.55 mW), respectively. FIG. 19 presents symbol patterns measured at the receiver for the 4 bits design. Data symbols are designed in the following patterns: (1111), (1000), (1010), (0101), (0011), (0111). The fm ranges from 1 MHz to 1.14 MHz to accommodate all 4 bits. Measurement results show that all the symbols are successfully detected and match the designed signal patterns. In the 8 bits (FIG. 20) and 12 bits (FIG. 21) designs, the fm ranges from 1 MHz to 1.39 MHz and from 1 MHz to 1.79 MHz, respectively. The 8 bits design has symbol patterns of (11111111), (00000000), (10011100), (10000011) and the 12 bits design has symbol patterns of (111111111111), (000000000000), (100000011100), (100000000011). Similarly, all symbols of the 8 bits and 12 bits RFID are successfully detected as shown in FIGS. 20 and 21. For the measurement setup, Pt is 15 dBm, Tx/Rx-tag distance is 20 cm, interrogation frequency is 17.46 GHz. Note that the plastic enclosure as obstruction between the tag and the Tx/Rx can cause extra 1 to 2 dB attenuation. The measurement results shown in FIGS. 1 C. Dynamic Single-Bit Communications With Maximum Data Rate.

Figure 22:
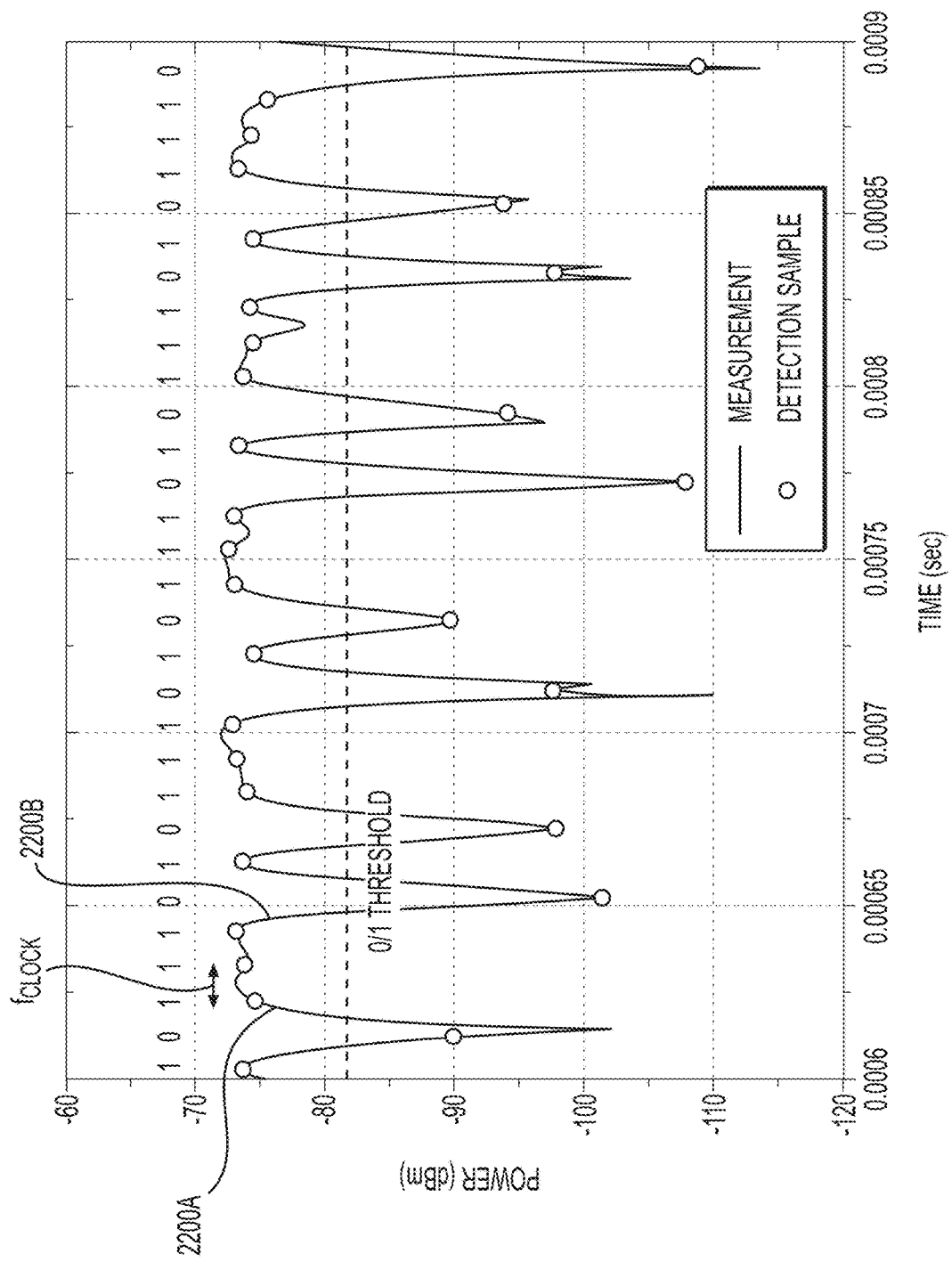
FIG. 22 is an illustration of the measured signal strength of the transmitted symbols depicting both the modulated backscatter signals and the post-measurement signal processing sampled signals.

The third application is focused on providing high data rate communication between the interrogator and the tag. In one non-limiting set-up, experimental designs have a 1-bit RFID with 100% logic utilization and maximum power consumption of 9.5 dBm (8.91 mW) to maximize SNR. The fm is set at 1.92 MHz and the fs is set at 100 kHz, providing a data rate of 100 kbits/sec. In order to estimate the bit error rate (BER), this embodiment uses the VSA with a sampling rate of 2.56 MHz to record more than 1 million transmitting bits (1091227 bits) for around 11 seconds. The RFID tag modulates the carrier signals with a testing symbol pattern of (111010). FIG. 22 presents the measured signal strength of the transmitted symbols. Solid curve is the modulated backscatter signals measured by the VSA, while red circles are post-measurement signal processing sampled signals. In order to detect bit 0 and bit 1, a threshold value of −81 dBm is chosen since it provides the lowest BER. Our signal processing results show that only 2 errors are detected among all 1091227 transmitted bits, that is, a proposed RFID tag achieves a BER of 0.00000183 (10-6) at a data rate of 100 kbits/sec. For the measurement setup, Pt is 15 dBm, Tx/Rx-tag distance is 20 cm, interrogation frequency is 17.46 GHz. Note that the plastic enclosure as obstruction between the tag and the Tx/Rx can cause extra 1 to 2 dB attenuation. The measurement results shown in FIG. 22 are without obstruction for better SNR demonstration.

FIG. 23 illustrates an exemplary computer that may comprise all or a portion of an antenna-less RFID device or antenna-less RFID control system. Conversely, any portion or portions of the computer illustrated in FIG. 23 may comprise all or an antenna-less RFID device or antenna-less RFID control system. As used herein, "computer" may include a plurality of computers. The computers may include one or more hardware components such as, for example, a processor 1021, a random-access memory (RAM) module 1022, a read-only memory (ROM) module 1023, a storage 1024, a database 1025, one or more input/output (I/O) devices 1026, and an interface 1027. Alternatively, and/or additionally, the computer may include one or more software components such as, for example, a computer-readable medium including computer executable instructions for performing a method associated with the exemplary embodiments such as, for example, an algorithm for transmitting a 36-bit static ID. It is contemplated that one or more of the hardware components listed above may be implemented using software. For example, storage 1024 may include a software partition associated with one or more other hardware components. It is understood that the components listed above are exemplary only and not intended to be limiting.

Processor 1021 may include one or more processors, each configured to execute instructions and process data to perform one or more functions associated with a computer for controlling a system (e.g., configuring the switching devices) and/or receiving and/or processing and/or transmitting data associated with a network of antenna-less RFID devices. Processor 1021 may be communicatively coupled to RAM 1022, ROM 1023, storage 1024, database 1025, I/O devices 1026, and interface 1027. Processor 1021 may be configured to execute sequences of computer program instructions to perform various processes. The computer program instructions may be loaded into RAM 1022 for execution by processor 1021. RAM 1022 and ROM 1023 may each include one or more devices for storing information associated with operation of processor 1021. For example, ROM 1023 may include a memory device configured to access and store information associated with the computer, including information for identifying, initializing, and monitoring the operation of one or more components and subsystems. RAM 1022 may include a memory device for storing data associated with one or more operations of processor 1021. For example, ROM 1023 may load instructions into RAM 1022 for execution by processor 1021.

Storage 1024 may include any type of mass storage device configured to store information that processor 1021 may need to perform processes consistent with the disclosed embodiments. For example, storage 1024 may include one or more magnetic and/or optical disk devices, such as hard drives, CD-ROMs, DVD-ROMs, or any other type of mass media device.

Database 1025 may include one or more software and/or hardware components that cooperate to store, organize, sort, filter, and/or arrange data used by the computer and/or processor 1021. For example, database 1025 may store data related to the remote sensing data correlated with signal attenuation. The database may also contain data and instructions associated with computer-executable instructions for controlling a system (e.g., a remote sensing and modeling system) and/or receiving and/or processing and/or transmitting data associated with a network of sensor nodes used to measure water quality. It is contemplated that database 1025 may store additional and/or different information than that listed above.

I/O devices 1026 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 1026 may also include a display including a graphical user interface (GUI) for outputting information on a monitor. I/O devices 1026 may also include peripheral devices such as, for example, a printer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1027 may include one or more components configured to transmit and receive data via a communication network, such as the Internet, a local area network, a workstation peer-to-peer network, a direct link network, a wireless network, or any other suitable communication platform. For example, interface 1027 may include one or more modulators, demodulators, multiplexers, demultiplexers, network communication devices, wireless devices, antennas, modems, radios, receivers, transmitters, transceivers, and any other type of device configured to enable data communication via a wired or wireless communication network.

Considering the numerous configurations for the computerized equipment described above, this disclosure incorporates embodiments of varying scope that implements the concepts discussed herein. Broadly, in one non-limiting embodiment, A semi-passive radio frequency identification (RFID) tag 172 may be characterized as a digital circuit 300, 499 comprising switching components 305, 315, 325, 400, 405, 410, 415 operating within an interrogation range of an incident carrier wave 115. A plurality of input connections 174 and output connections 175 directing data communications (D) through the switching components within the digital circuit, wherein the data communications are subject to switching operations of the switching components between at least one of the input connections 174, D and at least one of the output connections 175, Q. A backscatter response 287A, 287B is reflected from the digital circuit upon arrival of the incident carrier wave, wherein the backscatter response is a modulated backscatter response 727 in the presence of the switching operations. The digital circuit 300, 499 implements the backscatter response 287A, 287B in the absence of an analog element operating as a separate antenna structure. Information channels 729 of modulated backscatter data 727 are discernible from the backscatter response 287A, 287B by associated computerized equipment such as various transceiver embodiments. Respective switching clocks 302 are programmed to exhibit a modulation frequency for each corresponding set of the switching components. Respective sections of the digital circuit modulate the backscatter response at a respective one of the modulation frequencies. A static identification code is discernible from the information channels of modulated backscatter data. The digital circuit includes a field programmable gate array. The digital circuit includes at least one application specific integrated circuit (ASIC). The digital circuit includes at least one processor that controls the switching components according to a software program stored in an associated memory that is in data communication with the processor, and the processor activities implemented by the software program control the backscatter response according to instructions from the software program. In other embodiments, the digital circuit may include an array 499 of serially connected switching components, 400A-400D, 405A-405D, 410A-415D, 420A-420D, and the array includes parallel operated groups of the serially connected switching components. The parallel operated groups switch at different modulation frequencies.

In other non-limiting embodiments, a semi-passive radio frequency identification (RFID) tag may be described as a digital circuit having a clock connected to switching components having a plurality of respective outputs switched by a clock input, wherein the clock input has a clock frequency $f_{clock}$ and the respective outputs exhibit a modulating frequency $f_m$. Respective output impedances for the switching components care configured for updating in response to the clock input, and a respective radar cross section response is exhibited at each of the switching components. The updated output impedances modulate the respective radar cross sections, and respective information channels of data are discernible from modulations of the respective radar cross section responses. The respective output impedances correspond to respectively switched states of RF loads at each of the switching components, wherein the states vary the tag's reflection coefficient. At least a static identification code or even a dynamically updated code is discernible from the information channels of data. The semi-passive RFID tag may include a digital circuit having an array of the switching components arranged in serial connection as a linear feedback shift register, wherein an output of a last switching component in the serial connection is connected as an input to a first switching component in the serial connection. The data is repeated across an active switching period and static across a quiet period within the modulating frequency. The modulations of respective radar cross sections are configured to modulate an input carrier wave having a carrier frequency of $f_{carrier}$ and directed to the digital circuit in a wireless transmission, and the modulated carrier wave is discernible in a respective information channel comprising a modulated backscatter signal having a first harmonic located at $f_{carrier}+/-f_m$. In another non-limiting embodiment, the semi-passive RFID tag utilizes a highest frequency for sidebands of the modulated backscatter signal, relative to the carrier frequency, that is less than two times the lowest frequency for detected sidebands. The semi-passive RFID tag in the form of digital circuit may be formed in an application specific integrated circuit (ASIC). The digital circuit includes an array of serially connected switching components, and the array includes parallel operated groups of the serially connected switching components, and the parallel operated groups switch at different modulation frequencies.

Another disclosed embodiment includes a semi-passive radio frequency identification (RFID) tag having an application specific integrated circuit (ASIC) with a plurality of logical switching elements having a clock connected to respective NMOS and PMOS transistors having a plurality of respective outputs switched by a clock input, wherein the clock input has a clock frequency fclock and the respective outputs exhibit a modulating frequency $f_m$. Respective input impedances and output impedances for the transistors are configured for updating in response to switching activity in accordance with the clock input, wherein the transistors comprise unbalanced on-state impedances. A respective radar cross section response is exhibited at the switching components, wherein updated output impedances modulate the respective radar cross section responses. Respective information channels of data are discernible from modulations of the respective radar cross section responses. In some embodiments, the transistors are connected in an array comprising respective parallel power sources in electrical communication with groups of serially connected transistors, and wherein the array has a logic utilization factor N that represents a total number of groups of serially connected transistors. The semi-passive radio frequency identification (RFID) tag may have a total input impedance of the RFID tag that is inversely related to the logic utilization factor N. The semi-passive radio frequency identification (RFID) tag may be a N value that is greater than 2.7 percent. The semi-passive radio frequency identification (RFID) tag exhibits information channels that are configured for interrogation with a carrier wave signal that has a frequency selected from 5.8 GHz, 17.46 GHz, and 26.5 GHz.

In a system for using backscatter data channels from an RFID tag a digital circuit includes a clock connected to switching components having a plurality of respective outputs switched by a clock input, wherein the clock input has a clock frequency fclock and the respective outputs exhibit a modulating frequency $f_m$. Respective output impedances for the switching components are configured for updating in response to the clock input. A respective radar cross section response exhibited at the switching components, wherein updated output impedances modulate the respective radar cross sections. Respective information channels of data discernible from modulations of the respective radar cross section responses, and an interrogating device includes a transceiver directing a carrier wave to the digital circuit and receiving backscatter signals from the digital circuit, wherein the backscatter signals are related to the respective radar cross section responses, and wherein the transceiver detects the data from the backscatter signals. In one system for using backscatter data channels from an RFID tag, the carrier wave has a frequency selected from 5.8 GHz, 17.46 GHz, and 26.5 GHz. A system for using backscatter data channels from an RFID tag operates with the respective output impedances corresponding to respectively switched states of RF loads at each of the switching components, wherein the states vary the tag's reflection coefficient. The digital circuit comprises an array of logical switching elements configured to transmit the data in respective bits of information. Each respective bit is separately switched in a bit pattern. In some embodiments, the bit pattern changes over time to exhibit a dynamic bit pattern. A system for using backscatter data channels from an RFID tag may include the bit pattern having individual bits that are turned on and off over time at a switching frequency (fs) to transmit the data. A system for using backscatter data channels from an RFID tag may include one of a single bit pattern, a 4-bit pattern, an 8-bit pattern, and a 12-bit pattern.

The figures illustrate the architecture, functionality, and operation of possible implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Overall, in one non-limiting theory of operation, existing analog-signal side-channels, such as electromagnetic emanations 120 shown in prior art FIG. 1, are a consequence of current-flow changes that are dependent on activity inside electronic circuits. This disclosure introduces a new class of side-channels that is a consequence of impedance changes in switching circuits, and are referred to as an impedance-based side-channel. One example of such a side-channel is when digital logic activity causes incoming electromagnetic signals of carrier waves, such as continuous wave 115 from a reader 110, to be modulated as they are reflected (backscattered), at frequencies that depend on both the incoming EM signal and the circuit activity. This can cause EM interference or leakage of sensitive information, but it can also be leveraged for radio frequency identification (RFID) tag design. This disclosure first introduces a new class of side-channels that, according to one non-limiting theory, is a consequence of impedance differences in switching circuits, referred to as an impedance-based side-channel. Having demonstrated that the impedance difference between transistor gates in the high-state and in the low-state changes the radar cross section (RCS) of a digital circuit and modulates the backscattered signal, this disclosure sets forth results of experiments that have investigated the possibility of implementing the proposed RFID on ASIC for signal enhancement. Accordingly, a digital circuit can be used as a semi-passive RFID tag. To illustrate the adaptability of the proposed RFID, this disclosure shows a variety of RFID applications across carrier frequencies at 5.8 GHz, 17.46 GHz, and 26.5 GHz to demonstrate the flexible carrier frequency selection and bit configuration.

These applications demonstrate flexible carrier frequency selection and bits configuration, such as static IDs with 6, 12, and 36 bits, which provide up to 68.7 billion ($2^{36}$) combinations of unique IDs, and multi-bit (4, 8, and 12 bits) dynamic RFIDs. A maximum data rate of 100 kbits/sec with a bit error rate (BER) of 0.00000183 (10-6) is achieved.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by claims herein.

REFERENCES

[1] A. Costanzo et al., "Merging RFID, visual and gesture recognition technologiesto generate and manage smart environments," in *Proc. IEEE Int. Conf. RFID-Technol. Appl.*, September 2011, pp. 521-526.

[2] L. Yang, A. Rida, R. Vyas, and M. M. Tentzeris, "RFID tag and RF structures on a paper substrate using Inkjet-printing technology," *IEEE Trans. Microw. Theory Techn.*, vol. 55, no. 12, pp. 2894-2901, December 2007.

[3] S.-J. Wu and T.-G. Ma, "A passive UHF RFID meandered tag antenna with tuning stubs," in *Proc. Asia-Pac. Microw. Conf.*, December 2006, pp. 1486-1492.

[4] P. Pursula et al., "Millimeter-wave identification—A new short-range radio system for low-power high data-rate applications," *IEEE Trans.*

[5] *Microw. Theory Techn.*, vol. 56, no. 10, pp. 2221-2228, October 2008. [5] S. Lemey et al., "Wearable flexible lightweight modular RFID tag with integrated energy harvester," *IEEE Trans. Microw. Theory Techn.*, vol. 64, no. 7, pp. 2304-2314, July 2016.

[6] K. Finkenzeller, *RFID Handbook: Fundamentals and Applications in Contactless Smart Cards and Identification*, 3rd ed. Hoboken, N.J., USA: Wiley, 2005.

[7] F. Pebay-Peyroula, J. Reverdy, E. Crochon, and T. Thomas, "Very high data rate contactless air interface: An innovative solution for card to reader link," in *Proc. IEEE Int. Conf. RFID (IEEE RFID)*, April 2010, pp. 203-209.

[8] N. Pillin, N. Joehl, C. Dehollain, and M. J. Declercq, "High data rate RFID tag/reader architecture using wireless voltage regulation," in *Proc. IEEE Int. Conf. RFID*, April 2008, pp. 141-149.

[9] J. Besnoff, M. Abbasi, and D. S. Ricketts, "High data-rate communication in near-field RFID and wireless power using higher order modulation," *IEEE Trans. Microw. Theory Techn.*, vol. 64, no. 2, pp. 401-413, February 2016.

[10] S. Tedjini et al., "Hold the chips: Chipless technology, an alternative technique for RFID," *IEEE Microw. Mag.*, vol. 14, no. 5, pp. 56-65, July/August 2013.

[11] V. Coskun, K. Ok, and B. Ozdenizci, *Developing NFC Applications*, Hoboken, N.J., USA: Wiley, 2012. [Online]. http://ieeexplore.ieee.org/xpl/articleDetails.jsp?arnumber=8044008.

[12] *Near-Field Communication (NFC) Market Analysis by Product (SD Cards, SIM Cards, NFC Covers, NFC ICs, NFC Tags and NFC Readers), by Application (Access Control, Ticketing, Data Sharing, Medical Devices, Transaction, Product Identification) and Segment Forecasts till 2024*. Accessed: October 2016. [Online]. Available: https://www.grandviewresearch.com/industry-analysis/nearfield-communication-nfc-market

[13] P. Chan and V. Fusco, "Bi-static 5.8 Ghz RFID range enhancement using retrodirective techniques," in *Proc. 41st Eur. Microw. Conf.*, October 2011, pp. 976-979.

[14] W. G. Yeoh et al., "A 2.45-GHz RFID tag with on-chip antenna," in *Proc. IEEE Radio Freq. Integr. Circuits (RFIC) Symp.*, June 2006, p. 4.

[15] I. Vaisband and E. G. Friedman, "Stability of distributed power delivery systems with multiple parallel on-chip LDO regulators," *IEEE Trans. Power Electron.*, vol. 31, no. 8, pp. 5625-5634, August 2016.

[16] E. Perret et al., "THID, the next step of chipless RFID," in *Proc. IEEE Int. Conf. RFID (RFID)*, April 2013, pp. 261-268.

[17] S. Preradovic and N. C. Karmakar, "Design of fully printable planar chipless RFID transponder with 35-bit data capacity," in *Proc. Eur. Microw. Conf. (EuMC)*, September 2009, pp. 13-16.

[18] M. Popperl, J. Adametz, and M. Vossiek, "Polarimetric radar barcode: A novel chipless RFID concept with high data capacity and ultimate tag robustness," *IEEE Trans. Microw. Theory Techn.*, vol. 64, no. 11, pp. 3686-3694, November 2016.

[19] (2016). *Teardowns*. [Online]. Available: https://www.ifixit.com/Teardown

[20] D. Wu, M. J. Hussain, S. Li, and L. Lu, "R2: Over-the-air reprogramming on computational RFIDs," in *Proc. IEEE Int. Conf. RFID (RFID)*, May 2016, pp. 1-8.

[21] D. D. Donno, L. Catarinucci, A. D. Serio, and L. Tarricone, "A long-range computational RFID tag for temperature and acceleration sensing applications," *Progr. Electromagn. Res. C*, vol. 45, pp. 223-235, December 2013.

[22] R. Colella, D. D. Donno, L. Tarricone, and L. Catarinucci, "Unconventional UHF RFID tags with sensing and computing capabilities," *J. Commun. Softw. Syst.*, vol. 10, no. 2, pp. 83-89, 2014.
[23] T. Bjorninen et al., "Wireless measurement of RFID IC impedance," *IEEE Trans. Instrum. Meas.*, vol. 60, no. 9, pp. 3194-3206, September 2011.
[24] M. S. Reynolds, "A 500° C. tolerant ultra-high temperature 2.4 Ghz 32 bit chipless RFID tag with a mechanical BPSK modulator," in *Proc. IEEE Int. Conf. RFID (RFID)*, May 2017, pp. 144-148.
[25] H. Stockman, "Communication by means of reflected power," *Proc. IRE*, vol. 36, no. 10, pp. 1196-1204, October 1948.
[26] J. D. Griffin and G. D. Durgin, "Complete link budgets for backscatter radio and RFID systems," *IEEE Antennas Propag. Mag.*, vol. 51, no. 2, pp. 11-25, April 2009.
[27] J. M. Rabaey, A. Chandrakasan, and B. Nikolic, *Digital Integrated Circuits*, 3rd ed. Upper Saddle River, N.J., USA: Prentice-Hall, 2008.
[28] M. Prvulovic, A. Zaji'c, R. L. Callan, and C. J. Wang, "A method for finding frequency-modulated and amplitude-modulated electromagnetic emanations in computer systems," *IEEE Trans. Electromagn. Compatibility*, vol. 59, no. 1, pp. 34-42, February 2017.
[29] *GNA-130F*. [Online]. Available: http://rfbayinc.com/products_pdf/product_2_520.pdf
[30] *FMR-6000 User Manual*. Accessed: November 2010. [Online]. Available: https://fccid.io/VBLFMR-6000/User-Manual/Users-Manual-1393998
[31] *CMR-6100 Data Sheet*, Intelleflex Corporat., Santa Clara, Calif., USA, 2012. [Online]. Available: http://www.rfidmarket.com.tr/Data/EditorFiles/CMR-6100.pdf
[32] *Bonding Wires for Semiconductor Technology*, Scanditron, Spånga, Sweden. [Online]. Available: http://www.scanditron.com/sites/default/files/material/heraeus_bondingwire_brochure.pdf
[33] *Calculator for Resistance of a Round Straight Wire*. Accessed: September 2010. [Online]. Available: https://chemandy.com/calculators/roundwire-ac-resistance-calculator.htm
[34] *BSIM4 NMOS Model*, Keysight Technol., Santa Rosa, Calif., USA. [Online]. Available: http://edadocs.software.keysight.com/pages/viewpage.action?pageId=5512312
[35] *BSIM4 PMOS Model*, Keysight Technol., Santa Rosa, Calif., USA. [Online]. Available: http://edadocs.software.keysight.com/pages/viewpage.action?pageId=5512639
[36] *Cyclone V Device*, Data Sheet CV-51002, Altera Corporat., San Jose, Calif., USA, December 2016.

The invention claimed is:

1. A semi-passive radio frequency identification (RFID) tag comprising:
 a digital circuit comprising switching components operating within an interrogation range of an incident carrier wave;
 a plurality of input connections and output connections directing data communications through the switching components within the digital circuit, wherein the data communications are subject to switching operations of the switching components between at least one of the input connections and at least one of the output connections;
 a backscatter response reflected from the switching components of the digital circuit upon arrival of the incident carrier wave, wherein the backscatter response is a modulated backscatter response during the switching operations;
 wherein information channels of modulated backscatter data is discernible from the backscatter response.

2. The RFID tag of claim 1, wherein the digital circuit implements the backscatter response in the absence of an analog element operating as a separate antenna structure.

3. The RFID tag of claim 1, further comprising respective switching clocks that are programmed to exhibit a modulation frequency applied to corresponding sets of the switching components.

4. The RFID tag of claim 3, wherein respective sections of the digital circuit modulate the backscatter response at a respective one of the modulation frequencies.

5. The RFID tag claim 4, comprising a static identification code discernible from the information channels of modulated backscatter data.

6. The RFID tag of claim 1, wherein said digital circuit comprises a field programmable gate array.

7. The RFID tag of claim 1, wherein said digital circuit comprises at least one application specific integrated circuit (ASIC).

8. The RFID tag of claim 1, wherein said digital circuit comprises at least one processor that controls the switching components according to a software program stored in an associated memory that is in data communication with the processor, wherein processor activities implemented by the software program control the backscatter response according to instructions from the software program.

9. The RFID tag of claim 1, wherein said digital circuit comprises an array of serially connected switching components, and said array comprises parallel operated groups of said serially connected switching components, and said parallel operated groups switch at different modulation frequencies.

10. A semi-passive radio frequency identification (RFID) tag comprising:
 a digital circuit comprising a clock connected to switching components having a plurality of respective outputs switched by a clock input, wherein the clock input has a clock frequency $f_{clock}$ and the respective outputs exhibit a modulating frequency $f_m$;
 respective output impedances for the switching components connected to the clock input;
 a respective radar cross section response exhibited at each of the switching components, wherein the output impedances modulate the respective radar cross sections;
 respective information channels of data discernible from modulations of the respective radar cross section responses.

11. The semi-passive RFID tag according to claim 10, wherein the respective output impedances correspond to respectively switched states of RF loads at each of the switching components, wherein the states vary the tag's reflection coefficient.

12. The semi-passive RFID tag according to claim 10, wherein the modulations of respective radar cross sections are configured to modulate an input carrier wave having a carrier frequency of $f_{carrier}$ and directed to the digital circuit in a wireless transmission, and wherein the modulated carrier wave is discernible in a respective information channel comprising a modulated backscatter signal having a first harmonic located at $f_{carrier} +/- f_m$.

13. The semi-passive RFID tag according to claim 10, wherein said digital circuit is formed in an application specific integrated circuit (ASIC).

14. The semi-passive RFID tag according to claim 10, wherein said digital circuit comprises an array of serially connected switching components, and said array comprises parallel operated groups of said serially connected switching components, and said parallel operated groups switch at different modulation frequencies.

15. A system for using backscatter data channels from an RFID tag, comprising:
   a digital circuit comprising a clock connected to switching components having a plurality of respective outputs switched by a clock input, wherein the clock input has a clock frequency $f_{clock}$ and the respective outputs exhibit a modulating frequency $f_m$;
   respective output impedances for the switching components connected to the clock input;
   a respective radar cross section response exhibited at the switching components, wherein the output impedances modulate the respective radar cross sections;
   respective information channels of data discernible from modulations of the respective radar cross section responses; and
   an interrogating device comprising
      a transceiver directing a carrier wave to the digital circuit and receiving backscatter signals from the digital circuit, wherein the backscatter signals are related to the respective radar cross section responses, and wherein the transceiver detects the data from the backscatter signals.

16. A system for using backscatter data channels from an RFID tag according to claim 15, wherein the respective output impedances correspond to respectively switched states of RF loads at each of the switching components, wherein the states vary the tag's reflection coefficient.

17. A system for using backscatter data channels from an RFID tag according to claim 16, wherein the digital circuit comprises an array of logical switching elements configured to transmit the data in respective bits of information.

18. A system for using backscatter data channels from an RFID tag according to claim 17, wherein each respective bit is separately switched in a bit pattern.

19. A system for using backscatter data channels from an RFID tag according to claim 18, wherein the bit pattern changes over time to exhibit a dynamic bit pattern.

* * * * *